(12) United States Patent
Wang et al.

(10) Patent No.: US 11,846,590 B2
(45) Date of Patent: Dec. 19, 2023

(54) MEASUREMENT SYSTEM, METHOD, APPARATUS, AND DEVICE

(71) Applicant: ALIBABA GROUP HOLDING LIMITED, Grand Cayman (KY)

(72) Inventors: Tenghui Wang, Hangzhou (CN); Hsiang-Sheng Ku, Hangzhou (CN); Jingwei Zhou, Hangzhou (CN); Chunqing Deng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 231 days.

(21) Appl. No.: 17/171,462

(22) Filed: Feb. 9, 2021

(65) Prior Publication Data

US 2021/0247329 A1 Aug. 12, 2021

(30) Foreign Application Priority Data

Feb. 11, 2020 (CN) .......................... 202010086900.8

(51) Int. Cl.
*G01N 22/00* (2006.01)
*G06N 10/00* (2022.01)
(Continued)

(52) U.S. Cl.
CPC .......... *G01N 22/00* (2013.01); *G06F 11/2236* (2013.01); *G06N 3/04* (2013.01);
(Continued)

(58) Field of Classification Search
CPC .......... G06N 10/00; G06N 3/04; G06N 10/40; G06N 3/08; G06N 10/70; G06F 11/2236; G01N 22/00
(Continued)

(56) References Cited

U.S. PATENT DOCUMENTS

| 9,940,212 B2 * | 4/2018 | Kelly .................. G06F 11/2273 |
| 2017/0351967 A1 * | 12/2017 | Babbush ................ G06N 10/60 |
| 2018/0260732 A1 * | 9/2018 | Bloom ................... G06N 10/00 |

FOREIGN PATENT DOCUMENTS

| WO | WO 2019/241879 A1 | 12/2019 |
| WO | WO 2020/019015 A1 | 1/2020 |

OTHER PUBLICATIONS

M. Nagiloo et al. "Heat and work along individual trajectories of a quantum bit." pp. 1-11 Apr. 29, 2019.
(Continued)

*Primary Examiner* — Arnold M Kinkead
(74) *Attorney, Agent, or Firm* — Finnegan, Henderson Farabow, Garrett & Dunner, LLP

(57) ABSTRACT

Methods, apparatuses, and systems include acquiring initial environmental information corresponding to a superconducting qubit received from a superconducting circuit, the superconducting circuit being in an environment; determining first environmental information corresponding to the superconducting qubit in response to a quantum energy level of the superconducting qubit being a first preset energy level; determining second environmental information corresponding to the superconducting qubit in response to the quantum energy level of the superconducting qubit being a second preset energy level; determining effective environmental information based on the first environmental information and the second environmental information; and determining arbitrary-order correlation information for identifying an environmental noise based on the effective environmental information and the initial environmental information.

19 Claims, 15 Drawing Sheets

(51) Int. Cl.
　　*G06N 10/40*　　(2022.01)
　　*G06N 3/04*　　(2023.01)
　　*G06N 3/08*　　(2023.01)
　　*G06F 11/22*　　(2006.01)

(52) U.S. Cl.
　　CPC .............. *G06N 3/08* (2013.01); *G06N 10/00* (2019.01); *G06N 10/40* (2022.01)

(58) Field of Classification Search
　　USPC ............. 977/933; 706/906, 903, 25; 901/46; 257/34; 326/1, 4, 5, 6, 3; 505/190, 170
　　See application file for complete search history.

(56) References Cited

OTHER PUBLICATIONS

International Search Report and written opinion in International Application No. PCT/US2021/017213, dated Apr. 26, 2021 (9 pages).
European Patent Office Communication issued for Application No. 21753034.4 the Supplementary European Search Report (Art. 153(7) EPC) and the European search opinion dated May 12, 2023, 7 pages.
Ramos et al., "Correlated Dephasing Noise in Single-photon Scattering," arxiv.org, Cornell University Library, 30 pages, 2018.
Sakuldee et al., "Spectroscopy of classical environmental noise with a qubit subjected to projective measurements," arxiv.org, Cornell University Library, 13 pages, 2019.
Wang et al., "Characterization of arbitrary-order correlations in quantum baths by weak measurement," arxiv.org, Cornell University Library, 5 pages, 2019.

\* cited by examiner

MEASUREMENT SYSTEM, METHOD, APPARATUS, AND DEVICE

CROSS-REFERENCE TO RELATED APPLICATION(S)

This application claims priority to Chinese Patent Application No. 202010086900.8, filed on Feb. 11, 2020, the content of which is incorporated by reference herein in its entirety.

TECHNICAL FIELD

The present disclosure relates to the technical field of data processing, and in particular, to systems, methods, apparatuses, and devices for measurement.

BACKGROUND

Superconducting quantum bit is an artificial controllable two-energy level system based on a superconducting circuit and can be a basic unit of quantum computing. The superconducting circuit can refer to a circuit constructed based on a superconducting material. Preserving long-term coherence of superconducting quantum bits can be the basis of quantum computing. However, the presence of an environmental noise can cause decoherence of the superconducting quantum bits. Therefore, measurement of arbitrary-order correlations of an environmental noise can facilitate understanding of relevant information of the environmental noise.

SUMMARY OF THE DISCLOSURE

The present disclosure methods, systems and non-transitory computer readable media for measurement. In an aspect, a non-transitory computer-readable medium is provided, which stores a set of instructions that is executable by at least one processor of an apparatus to cause the apparatus to perform a method. The method includes: acquiring initial environmental information corresponding to a superconducting qubit received from a superconducting circuit, the superconducting circuit being in an environment; determining first environmental information corresponding to the superconducting qubit in response to a quantum energy level of the superconducting qubit being a first preset energy level; determining second environmental information corresponding to the superconducting qubit in response to the quantum energy level of the superconducting qubit being a second preset energy level; determining effective environmental information based on the first environmental information and the second environmental information; and determining arbitrary-order correlation information for identifying an environmental noise based on the effective environmental information and the initial environmental information.

In another aspect, a system for measurement is provided. The apparatus includes a superconducting circuit being in an environment and configured to generate a superconducting qubit, and a control circuit electrically connected to the superconducting circuit. The control circuit is configured to perform: acquiring initial environmental information corresponding to the superconducting qubit; determining first environmental information corresponding to the superconducting qubit in response to a quantum energy level of the superconducting qubit being a first preset energy level; determining second environmental information corresponding to the superconducting qubit in response to the quantum energy level of the superconducting qubit being a second preset energy level; determining effective environmental information based on the first environmental information and the second environmental information; and determining arbitrary-order correlation information for identifying an environmental noise based on the effective environmental information and the initial environmental information.

In another aspect, a method for measurement is provided. The method includes: acquiring initial environmental information corresponding to a superconducting qubit received from a superconducting circuit, the superconducting circuit being in an environment; determining first environmental information corresponding to the superconducting qubit in response to a quantum energy level of the superconducting qubit being a first preset energy level; determining second environmental information corresponding to the superconducting qubit in response to the quantum energy level of the superconducting qubit being a second preset energy level; determining effective environmental information based on the first environmental information and the second environmental information; and determining arbitrary-order correlation information for identifying an environmental noise based on the effective environmental information and the initial environmental information.

In another aspect, a non-transitory computer-readable medium is provided, which stores a set of instructions that is executable by at least one processor of an apparatus to cause the apparatus to perform a method. The method includes: acquiring first environmental information corresponding to a superconducting qubit at a first preset time, the superconducting qubit being received from a superconducting circuit; acquiring second environmental information corresponding to the superconducting qubit at a second preset time, the second preset time being different from the first preset time; and determining arbitrary-order correlation information for identifying an environmental noise based on the first environmental information and the second environmental information.

In another aspect, a method for measurement is provided. The methods includes: acquiring first environmental information corresponding to a superconducting qubit at a first preset time, the superconducting qubit being received from a superconducting circuit; acquiring second environmental information corresponding to the superconducting qubit at a second preset time, the second preset time being different from the first preset time; and determining arbitrary-order correlation information for identifying an environmental noise based on the first environmental information and the second environmental information.

BRIEF DESCRIPTION OF THE DRAWINGS

The accompanying drawings illustrating embodiments of this disclosure are briefly described below. The drawings described below are for examples only, and those of ordinary skill in the art can still derive other drawings from these drawings without creative efforts. Various features shown in the accompanying drawings are not drawn to scale.

DETAILED DESCRIPTION

Figure 1:
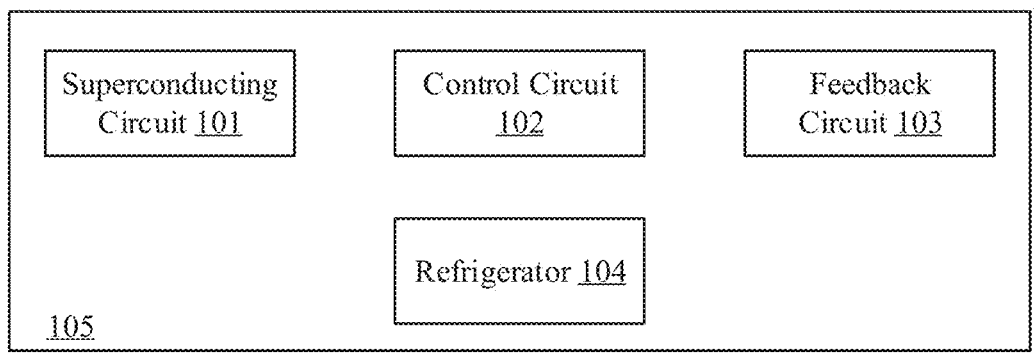
FIG. 1 is a diagram illustrating an example measurement system, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. Based on the embodiments of the present disclosure, all other embodiments derived by those of ordinary skill in the art without creative efforts should fall within the protection scope of the present disclosure. Particular aspects of the present disclosure are described in greater detail below. The embodiments described below and features in the embodiments can be combined with each other when there is no conflict between the embodiments. The terms and definitions provided herein control, if in conflict with terms and/or definitions incorporated by reference.

A "computer," as used herein, refers to a machine capable of executing instructions, calculations, computations, or algorithms for performing a series of ordered procedures or operations purporting to solve a task. Computers are ubiquitous in modem-day society, including direct involvement (e.g., smartphones and laptops) and indirect involvement (e.g., microcontrollers in cars or control systems in water purification plants). A computer must be implemented on some type of hardware (e.g., physical configuration of matter) subject to various limitations imposed by physics, which creates an upper bound on the computer's performance characteristics (e.g., amount of memory available or the number of operations-per-second allowed). Also, to solve a task, the computer must be provided with a set of instructions which, when followed, can cause the computer to accomplish the task.

A quantum computer, as used herein, refers to a computer that can perform quantum computations. Quantum computation in this disclosure refers to computation that uses quantum phenomena (e.g., superposition or entanglement) of hardware of the quantum computer. In contrast, a classical computer in this disclosure refers to a computer that cannot perform quantum computations, such as an electronic computer. Quantum computers can offer the ability to perform certain tasks deemed to be intractable to be solved by classical computers, and provide unique advantages. For example, a quantum computer can be used to simulate dynamics of molecules (that are governed by quantum physics in nature), factorize integers (that underlies many cryptography theories), search unstructured data, optimize quantum annealing and adiabatic processes, accelerate machine learning algorithms, or perform many computational tasks that are deemed intractable for classical computers. Such technological advantages can benefit many industries and research, such as creation of new materials, synthesis of new pharmaceuticals, or development of energy-dense batteries.

A classical computer operates in digital logic. Digital logic, as used herein, refers to a logic system that operates on units of information (referred to as "bits"). A bit can have one of two values as the smallest unit of information, usually denoted by "0" and "1." The digital logic can use digital logic gates to create, remove, or modify bits. Digital logic gates can be constructed using transistors, in which bits can be represented as voltage levels of wires connecting the transistors. A digital logic gate can take one or more bits as input and give one or more bits as output. For example, a logic AND gate can take two bits as input and gives one bit as output. The output of the AND gate can be "1" if the values of both inputs are "1," and can be "0" if otherwise. By connecting inputs and outputs of various digital logic gates together in specific ways, a classical computer can implement arbitrarily complex algorithms to accomplish various computational tasks.

On a surface level, quantum computers operate in a similar way to classical computers. A quantum computer operates in quantum logic. Quantum logic, as used herein, refers to a system of logic that operates on units of information referred to as "quantum bits" or simply "qubits." A qubit is the smallest unit of information in quantum computers, and can have any linear combination of two values, usually denoted |0⟩ and |1⟩. The value of the qubit can be denoted |ψ⟩. In this disclosure, the symbol "| ⟩" is a representation of a quantum state. Different from a digital bit that can have a value of either "0" or "1," |ψ⟩ can have a value of α|0⟩+β|1⟩ where α and β are complex numbers (referred to as "amplitudes") not limited by any constraint except $|α|^2+|β|^2=1$. Qubits can be constructed in various forms and can be represented as quantum states of components of the quantum computer. For example, a qubit can be physically implemented using photons (e.g., in lasers) with their polarizations as the quantum states, electrons or ions (e.g., trapped in an electromagnetic field) with their spins as the quantum states, Josephson junctions (e.g., in a superconducting quantum system) with their charges, current fluxes, or phases as the quantum states, quantum dots (e.g., in semiconductor structures) with their dot spin as the quantum states, topological quantum systems, or any other system that can provide two or more quantum states. The quantum logic can use quantum logic gates (or simply "quantum gates") to create, remove, or modify qubits. Mathematically, a quantum gate is a propagator acting on a quantum state. Physically, a quantum gate can be implemented as a hardware device capable of generating laser pulses, electromagnetic waves (e.g., microwave pulses), electromagnetic fields, or any means for changing, maintaining, or controlling the quantum states of the qubits. A quantum gate can take one or more qubits as input and give one or more qubits as output, and thus can be represented as a matrix.

For example, a superconducting qubit, as used herein, can refer to an artificial controllable two-energy level system based on a superconducting circuit, which functions as a basic unit of quantum computing. The superconducting circuit in this closure can include a circuit constructed based on a superconducting material. Decoherence, as used herein, can refer to a process in which a qubit gradually loses quantum coherence. An environmental noise in this disclosure can refer to the sum of all noises that can interact with a superconducting qubit. "Arbitrary-order correlations in quantum baths," as used herein, can refer to a feature or characteristic used to calibrate related properties of the environmental noise.

One challenge to the quantum computers is that it is difficult to create and maintain qubits in a pure state (e.g., entangled with other qubits). The precision of a quantum circuit depends on the precision of the state of qubits and the operation (e.g., preparation, calibration, or measurement) of quantum gates (referred to as "state preparation and measurement errors" or "SPAM errors"). However, qubits are essentially analog devices and are highly susceptible to noise, from either the surrounding environments or the operation of the quantum gates. Once the qubits become decoherent due to the disturbance of the noise, the calculation of the qubits is lost and cannot be restored. Due to the susceptible nature of the qubits, the capability of identifying environmental noises are important consideration when designing and operating quantum computers.

This disclosure provides technical solutions for measurement, which can quickly and accurately determine arbitrary-order correlation information for identifying an environmental noise (e.g., arbitrary-order correlations in quantum baths). Such arbitrary-order correlation information can facilitate subsequent analysis and identification of the environmental noise improve the practicability of a quantum computing system (e.g., a measurement system). Aspects of this disclosure can relate to measurement, including systems, apparatuses, methods, and non-transitory computer-readable media. For ease of description, a method is described below, with the understanding that aspects to the method apply equally to systems, apparatuses, and non-transitory computer-readable media. For example, some aspects of such a method can be implemented by a system, an apparatus, or as program codes or computer instructions stored in a non-transitory computer-readable medium. In a broadest sense, the method is not limited to any particular physical or electronic instrumentalities, but rather can be accomplished using many different instrumentalities.

Figure 2A:
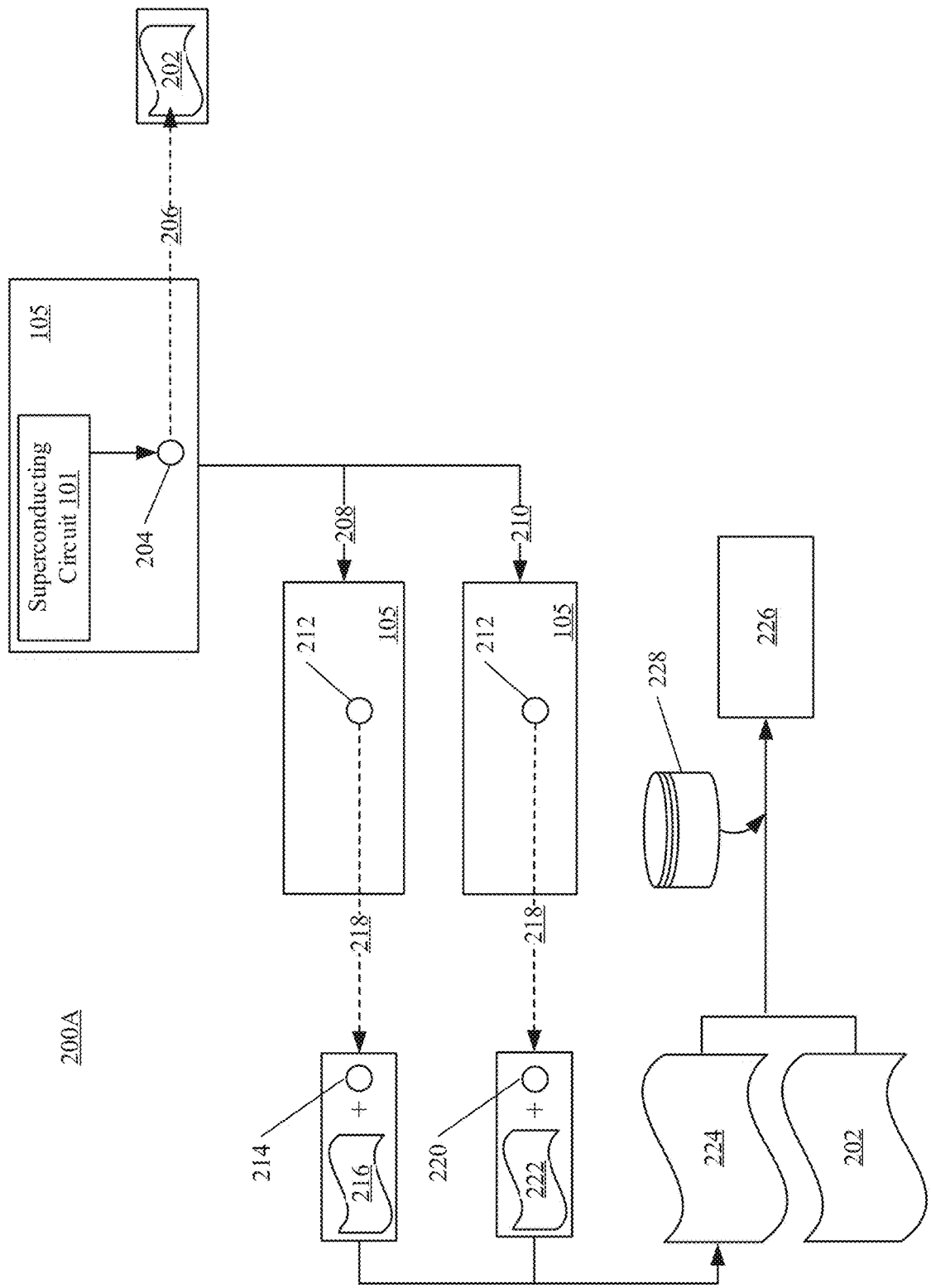
FIG. 2A is a flowchart illustrating an example application scenario of a measurement system, consistent with some embodiments of the present disclosure.

FIG. 1 is a diagram illustrating an example measurement system 100, consistent with some embodiments of the present disclosure. FIG. 2A is a flowchart 200A illustrating an example application scenario of a measurement system (e.g., measurement system 100), consistent with some embodiments of the present disclosure. Measurement system 100 can be used to obtain information of arbitrary-order correlations in quantum baths. As illustrated in FIG. 1, measurement system 100 can include a superconducting circuit 101 located in an environment 105, a control circuit 102 electrically connected to superconducting circuit 101, a feedback circuit 103 electrically connected to control circuit 102, and refrigerator 104 electrically connected to control circuit 102. As illustrated in FIG. 2A, superconducting circuit 101 can be configured to generate a superconducting qubit 204. For ease of explanation, the method for determining arbitrary-order correlation information, will be described with reference to FIGS. 1-2A hereinafter. It should be noted that FIGS. 1-2A are examples only and do not limit any aspect of this disclosure.

By way of example, with reference to FIGS. 1-2A, in some embodiments, superconducting circuit 101 (e.g., superconducting circuit 101 in FIG. 2A) can generate a superconducting qubit (e.g., superconducting qubit 204 in FIG. 2A) in an environment (e.g., environment 105 in FIGS. 1-2A). For example, the environment can include a low temperature environment for superconducting circuit 101 to operate normally. After superconducting circuit 101 generates the superconducting qubit, the superconducting qubit can be caused to interact with the environment for a time period. After such interaction, control circuit 102 connected to superconducting circuit 101 can analyze and process the superconducting qubit to acquire initial environmental information (e.g., initial environmental information 202 in FIG. 2A) corresponding to the superconducting qubit. The initial environmental information in this disclosure can refer to information obtained after a time when a superconducting qubit at an initial moment interacts with an environment (e.g., environment 105 in FIGS. 1-2A). In some embodiments, the initial environmental information can include at least one of the following: information about a magnetic flux in an environment, information about an electric field in the environment, or fluctuation information about a quantum noise in the environment. In some embodiments, the initial environmental information can be in a form of variation information or absolute amount information. The variation information in this disclosure can refer to parameter information that can change over time, such as change information about a magnetic flux in an environment or change information about an electric field in the environment. The absolute amount information in this disclosure can refer to parameter information that will not change over time, such as fluctuation amplitude information about a quantum noise in an environment or spectrum information about the quantum noise in the environment.

In some embodiments, control circuit 102 can obtain, analyze, and process the superconducting qubit (e.g., superconducting qubit 204 in FIG. 2A) generated by superconducting circuit 101 (e.g., as shown in FIG. 2A). For example, when control circuit 102 analyzes and processes the superconducting qubit, it can acquire (e.g., represented as first measurement step 206 in FIG. 2A) initial environmental information (e.g., initial environmental information 202 in FIG. 2A) corresponding to the superconducting qubit. In some embodiments, an initial preset energy level of the superconducting qubit at an initial moment can include a ground state or an excited state.

After acquiring the initial environmental information corresponding to the superconducting qubit (e.g., represented as first measurement step 206 in FIG. 2A), control circuit 102 can obtain a quantum energy level of the superconducting qubit at a first moment, and determine first environmental information corresponding to the superconducting qubit under a preset condition that the quantum energy level of the superconducting qubit is a first preset energy level. By way of example, as illustrated in a first branch 208 in FIG. 2A, control circuit 102 can obtain (e.g., represented as second measurement step 218) a quantum energy level (e.g., first energy level 214) of superconducting qubit 212 (e.g., representing superconducting qubit 204 after the first measurement step 206), and determine first environmental information 216. Control circuit 102 can also determine second environmental information corresponding to the superconducting qubit under a preset condition that the quantum energy level of the superconducting qubit is a second preset energy level. By way of example, as illustrated in a second branch 210 in FIG. 2A, control circuit 102 can obtain (e.g., represented as second measurement step 218) a quantum energy level (e.g., second energy level 220) of superconducting qubit 212 (e.g., representing superconducting qubit 204 after the first measurement step 206), and determine second environmental information 222.

In some embodiments, the quantum energy level (e.g., first energy level 214 or second energy level 220 in FIG. 2A) of the superconducting qubit (e.g., superconducting qubit 212 in FIG. 2A) obtained by control circuit 102 after acquiring the initial environmental information can include at least one of a ground state or an excited state. By way of example, as illustrated in FIG. 2A, after superconducting qubit 204 interacts with environment 105, the quantum energy level of superconducting qubit 212 can be in a ground state or an excited state.

After determining the first environmental information (e.g., first environmental information 216 in FIG. 2A) and the second environmental information (e.g., second environmental information 222 in FIG. 2A), control circuit 102 can determine effective environmental information (e.g., effective environmental information 224 in FIG. 2A) based on the first environmental information and the second environmental information. After that, control circuit 102 can determine arbitrary-order correlation information (e.g., arbitrary-order correlations in quantum baths, represented as arbitrary-order correlation information 226 in FIG. 2A) for identifying an environmental noise based on the effective environmental information (e.g., effective environmental information 224) and the initial environmental information (e.g., initial environmental information 202). For example, control circuit 102 can determine arbitrary-order correlation information (e.g., arbitrary-order correlation information 226 in FIG. 2A) based on the effective environmental information and the initial environmental information using a machine learning model (e.g., machine learning model 228 in FIG. 2A).

For example, the arbitrary-order correlation information can include second-order correlation information, third-order correlation information, fourth-order correlation information, or any multi-order correlation information. In some embodiments, the second-order correlation information can be used for identifying a noise spectral density of the superconducting qubit. In some embodiments, multi-order correlation information (e.g., third-order correlation information, fourth-order correlation information, or fifth-order correlation information) can be used for identifying the degree of correlation between various environmental information corresponding to the superconducting qubit after the superconducting qubit interacts with the environment at multiple time points of measurement. For example, the multi-order correlation information can be used for identifying fluctuation information of certain particles in the superconducting qubit.

In some embodiments, after obtaining the effective environmental information and the initial environmental information, control circuit 102 can obtain second-order correlation information based on the effective environmental information and the initial environmental information. For example, when determining the arbitrary-order correlation information for identifying an environmental noise based on the effective environmental information and the initial environmental information, control circuit 102 can be configured to determine an inner product of the effective environmental information and the initial environmental information as second-order correlation information for identifying an environmental noise.

In some embodiments, in order to obtain arbitrary-order correlation information (e.g., arbitrary-order correlation information 226 in FIG. 2A) for identifying an environmental noise, control circuit 102 can perform multiple measurement operations on the superconducting qubit. For example, after measuring the superconducting qubit for the first time, control circuit 102 can perform a second measurement operation based on the quantum energy level of the superconducting qubit. In some embodiments, control circuit 102 can determine first environmental information corresponding to the superconducting qubit under a preset condition that the quantum energy level of the superconducting qubit is a first preset energy level. For example, it can be assumed (e.g., represented as first branch 208 in FIG. 2A) that the quantum energy level of the superconducting qubit is the first preset energy level. Control circuit 102 can acquire second environmental information corresponding to the superconducting qubit under a preset condition that the quantum energy level of the superconducting qubit is a second preset energy level. In another example, it can be assumed (e.g., represented as second branch 210 in FIG. 2A) that the quantum energy level of the superconducting qubit is the second preset energy level.

In some embodiments, the first preset energy level can include a ground state or an excited state. The second preset energy level can include a ground state or an excited state. The second preset energy level and the first preset energy level can be different. For example, when the first preset energy level is a ground state, the second preset energy level can be an excited state. In another example, when the first preset energy level is an excited state, the second preset energy level can be a ground state.

In some embodiments, the specific content of the acquired first environmental information and second environmental information can be similar to the specific content of the initial environmental information. For example, the first environmental information can also include at least one of the following: information about a magnetic flux in an environment, information about an electric field in the environment, or fluctuation information about a quantum noise in the environment. In another example, the second environmental information can also include at least one of the following: information about a magnetic flux in an environment, information about an electric field in the environment, or fluctuation information about a quantum noise in the environment.

In some embodiments, when acquiring the first environmental information (e.g., first environmental information 216 in FIG. 2A) and the second environmental information (e.g., second environmental information 222 in FIG. 2A), control circuit 102 can send a microwave signal to superconducting circuit 101. After superconducting circuit 101 obtains the microwave signal, superconducting circuit 101 can generate a microwave feedback signal corresponding to the microwave signal. Then, control circuit 102 can analyze and process the microwave signal and the microwave feedback signal to determine first environmental information and second environmental information corresponding to a post-interaction qubit. It should be noted that control circuit 102 can acquire the first environmental information and the second environmental information in other ways, as long as the accuracy and reliability for acquiring the first environmental information and the second environmental information can be guaranteed. For ease of explanation without causing ambiguity, unless expressly described otherwise, such unlimiting embodiments of acquiring the first environmental information and the second environmental information will not be repeated hereinafter.

In some embodiments, after obtaining the first environmental information and the second environmental information, control circuit 102 can acquire the first environmental information under the preset condition that the quantum energy level of the superconducting qubit is the first preset energy level, and acquire the second environmental information under the preset condition that the quantum energy level of the superconducting qubit is the second preset energy level. In some embodiments, the quantum energy level of the superconducting qubit can meet a preset condition corresponding to either the first preset energy level or the second preset energy level. Control circuit 102 can analyze and process the first environmental information and the second environmental information to determine effective environmental information corresponding to the first environmental information and the second environmental information. In some embodiments, control circuit 102 can obtain the effective environmental information from the second measurement on the superconducting qubit.

For example, when the first preset energy level is a ground state, the second preset energy level can be an excited state, and the quantum energy level of the superconducting qubit after interacting with the environment can be a ground state. In such an example case, the quantum energy level of the superconducting qubit after interacting with the environment can only meet the first preset energy level but not the second preset energy level. Correspondingly, control circuit 102 can determine the first environmental information corresponding to the first preset energy level as the effective environmental information. In another example, when the quantum energy level of the superconducting qubit after interacting with the environment is an excited state, the quantum energy level of the superconducting qubit after interacting with the environment can only meet the second preset energy level but not the first preset energy level. Correspondingly, control circuit 102 can determine the second environmental information corresponding to the second preset energy level as the effective environmental information.

Referring back to FIG. 1, feedback circuit 103 of measurement system 100 is electrically connected to control circuit 102 and can generate, when the quantum energy level of the superconducting qubit is not a first preset energy level, a feedback signal corresponding to the first preset energy level. Feedback circuit 103 can also generate, when the quantum energy level of the superconducting qubit is not a second preset energy level, a feedback signal corresponding to the second preset energy level. The feedback signal can include a NOT-gate signal for adjusting the superconducting qubit.

Control circuit 102 can obtain the feedback signal generated from feedback circuit 103 and adjust superconducting circuit 101 based on the feedback signal, so that the quantum energy level of the superconducting qubit can be at the first preset energy level or the second preset energy level. For example, when the quantum energy level of the superconducting qubit generated by superconducting circuit 101 is not the first preset energy level or the second preset energy level, control circuit 102 can adjust the quantum energy level of the superconducting qubit through the feedback signal generated by feedback circuit 103, so that the quantum energy level of the superconducting qubit can be at the first preset energy level or the second preset energy level. By doing so, a response state to initialize the superconducting qubit after the first measurement can be quickly and effectively realized, and the accuracy and reliability of acquiring the first environmental information or the second environmental information can be ensured, which improves the use stability and reliability of measurement system 100.

Still referring to FIG. 1, refrigerator 104 of measurement system 100 is electrically connected to control circuit 102 and can maintain superconducting circuit 101 to be in an environment under the control of control circuit 102. By doing so, superconducting circuit 101 can stably generate a superconducting qubit, which can facilitate accurately and effectively acquiring the arbitrary-order correlation information for identifying an environmental noise.

Figure 2B:
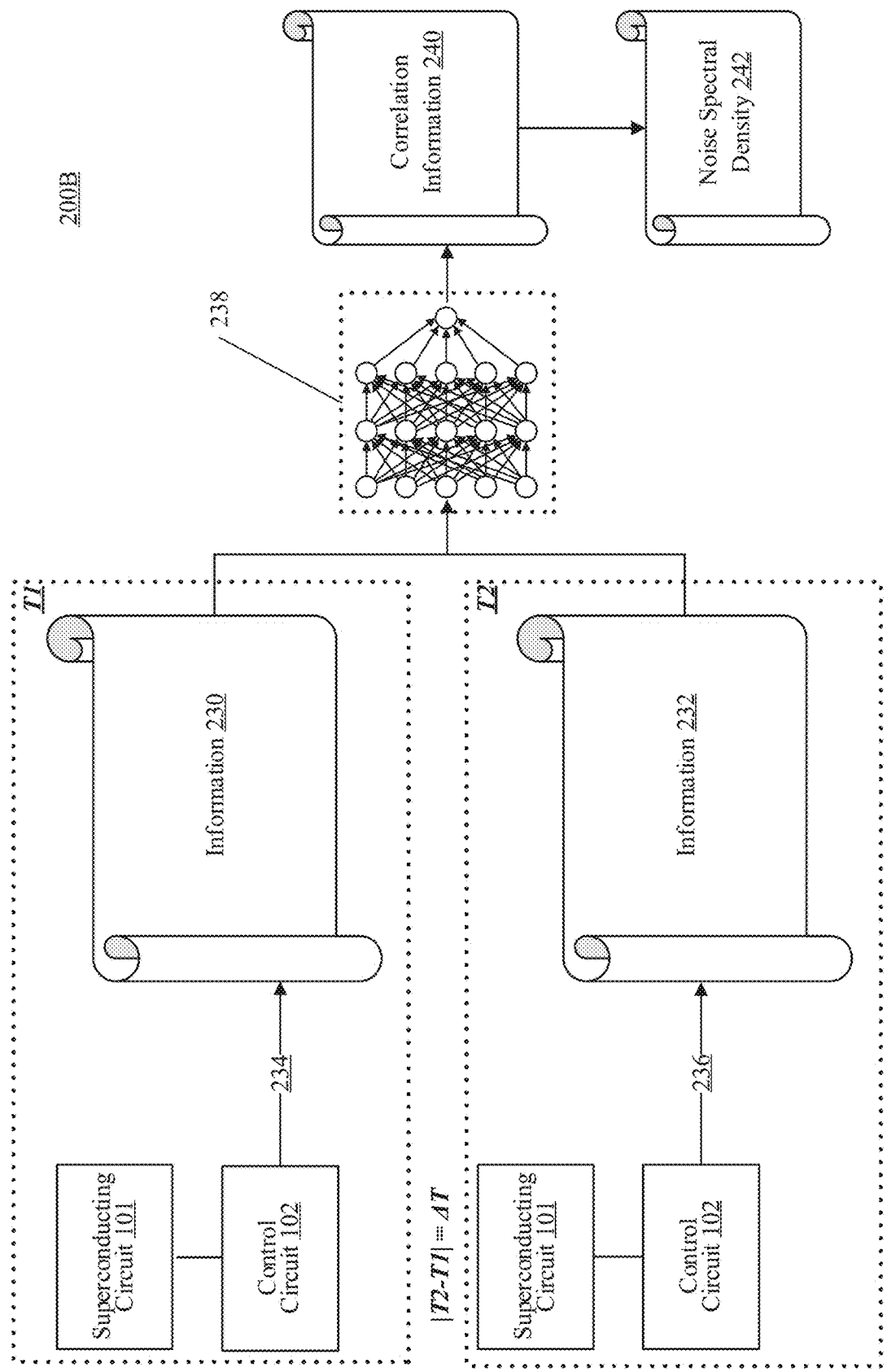
FIG. 2B is a flowchart illustrating another example application scenario of a measurement system, consistent with some embodiments of the present disclosure.

By way of example, FIG. 2B is a flowchart 200B illustrating an example application scenario of a measurement system, consistent with some embodiments of the present disclosure. As shown in FIG. 2B, control circuit 102 can measure superconducting circuit 101 at time T1 for the first time to obtain (e.g., represented as a measurement step 234 in FIG. 2B) information 230 (e.g., initial environmental information, or first environmental information 216 in FIG. 2A) corresponding to a superconducting qubit (e.g., superconducting qubit 212 in FIG. 2A). For example, information 230 can include at least one of information about a magnetic flux in an environment, information about an electric field in the environment, or fluctuation information about a quantum noise in the environment. Further, control circuit 102 can measure superconducting circuit 101 at time T2 for the second time, where $|T2-T1|=\Delta T$, $\Delta T>0$, to obtain (e.g., represented as a measurement step 236 in FIG. 2B) information 232 (e.g., second environmental information 222 in FIG. 2A) corresponding to the superconducting qubit. For example, information 236 can include at least one of information about a magnetic flux in an environment, information about an electric field in the environment, or fluctuation information about a quantum noise in the environment. After obtaining information 230 and information 232, for example, control circuit 202 can correlatively identify information 230 and information 232 to obtain (e.g., using a machine learning model, such as a neural network 238 in FIG. 2B) correlation information (e.g., second-order correlation information, represented as correlation information 240 in FIG. 2B) for identifying a noise spectral density (e.g., noise spectral density 242 in FIG. 2B) of the superconducting qubit.

In some embodiments, after obtaining the correlation information (e.g., second-order correlation information), control circuit 202 can determine the noise spectral density (e.g., noise spectral density 242 in FIG. 2B) of the superconducting qubit. The noise spectral density information of the superconducting qubit can be used to adjust parameters of the environment where superconducting circuit 101 is located, or to adjust superconducting circuit 101 to ensure its stable and reliable operation.

In some embodiments, in order to allow users to know noise spectral density information of the superconducting qubit in time, the noise spectral density can be visualized. For example, the measurement system (e.g., measurement system 100 in FIG. 1) can additionally include a display (not shown in FIG. 1). After obtaining the noise spectral density, control circuit 102 can send the noise spectral density to the display, so that users can intuitively and timely understand the noise spectral density information from the display, which can further improve the use convenience and reliability of the measurement system.

In some embodiments, besides at time T1 and time T2, control circuit 102 can measure the superconducting qubit for a third time (e.g., at time T3) after the second measurement of the superconducting qubit. For example, the process of the third measurement of the superconducting qubit can be the same or similar as the process of the second measurement of the superconducting qubit, so that control circuit 102 can obtain second effective environmental information (e.g., corresponding to effective environmental information 224 in FIG. 2A) from the third measurement, and then acquire third-order correlation information for identifying an environmental noise based on the effective environmental information (e.g., effective environmental information 224 in FIG. 2A), the initial environmental information (e.g., initial environmental information 202 in FIG. 2A), and the second effective environmental information. Similarly, control circuit 102 can obtain fourth-order correlation information, fifth-order correlation information, or any other arbitrary-order correlation information in a similar manner, which will not be described in detail herein.

By way of example, after superconducting circuit 101 generates a superconducting qubit, control circuit 102 can measure the superconducting qubit for the first time at first time T1 to acquire initial environmental information, and then control circuit 102 can measure the superconducting qubit after the first measurement for the second time at second time T2 to acquire first environmental information (e.g., first environmental information 216 in FIG. 2A) and second environmental information (e.g., second environmental information 222 in FIG. 2A). Then, by analyzing and processing the first environmental information and the second environmental information, control circuit 102 can acquire effective environmental information corresponding to second time T2. After obtaining the effective environmental information and the initial environmental information, control circuit 102 can analyze and process the effective environmental information and the initial environmental information. In some embodiments, a preset machine learning model (e.g., neural network 238) can be used to analyze and identify the effective environmental information and the initial environmental information to acquire second-order correlation information for identifying a correlation relationship between environmental information at different times between the effective environmental information and the initial environmental information. For example, the machine learning model can be trained to identify arbitrary-order correlation information between any number of pieces of environmental information.

In some embodiments, the effective environmental information can include at least one of information about a magnetic flux in an environment, information about an electric field in the environment, or fluctuation information about a quantum noise in the environment, and the initial environmental information can include at least one of information about a magnetic flux in the environment, information about an electric field in the environment, and fluctuation information about a quantum noise in the environment. To improve the quality and efficiency of data processing by the machine learning model (e.g., neural network 238 in FIG. 2B), when the machine learning model is used to analyze and identify the effective environmental information and the initial environmental information, at least one parameter (e.g., information about a magnetic flux in an environment) in the effective environmental information and the initial environmental information can be taken as a preset value, and the machine learning model can be used to analyze and process other parameters, so that arbitrary-order correlation information can be obtained quickly and accurately, which further improves the use stability and reliability of the measurement system.

In some embodiments, after the superconducting qubit is measured for the second time, control circuit 102 can measure the superconducting qubit after the second measurement (e.g., in a continuous manner) for the third time at third time T3 (e.g., in accordance with requirements of an application) to acquire fourth environmental information. Then, control circuit 102 can analyze and process the effective environmental information, the initial environmental information, and the fourth environmental information to acquire third-order correlation information for identifying an environmental noise. It should be noted that other arbitrary-order correlation information can be obtained in accordance with requirements of any specific application or design, which will not be described in detail hereinafter.

Consistent with some embodiments of this disclosure, in a measurement system (e.g., measurement system 100 in FIG. 1), after a superconducting circuit (e.g., superconducting circuit 101 in FIG. 1) generates a superconducting qubit and acquires initial environmental information of the superconducting qubit, a control circuit (e.g., control circuit 102 in FIG. 1) can determine first environmental information corresponding to the superconducting qubit under a preset condition that a quantum energy level of the superconducting qubit is a first preset energy level. The control circuit can determine second environmental information corresponding to the superconducting qubit under a preset condition that the quantum energy level of the superconducting qubit is a second preset energy level. The control circuit can then determine effective environmental information based on the first environmental information and the second environmental information. By doing so, the control circuit effectively determine a second measurement result of the superconducting qubit using a post-selection mode. Also, the control circuit can analyze and identify the effective environmental information and the initial environmental information for accurately and effectively determining arbitrary-order correlation information for identifying an environmental noise. Such a technical solution can facilitate subsequent analysis and identification of the environmental noise based on the arbitrary-order correlation information, and can thereby improve the practicability of the measurement system.

By way of example, with reference to FIGS. 1-2B, when a control circuit (e.g., control circuit 102) acquires initial environmental information (e.g., initial environmental information 202) corresponding to a superconducting qubit (e.g., superconducting qubit 204), the control circuit can acquire the initial environmental information corresponding to the superconducting qubit after the superconducting qubit interacts with the environment for a time period (e.g., resulting in forming superconducting qubit 212 from superconducting qubit 204).

A superconducting circuit (e.g., superconducting circuit 101) can generate the superconducting qubit, after which the superconducting qubit can interact with an environment (e.g., environment 105). In order to ensure the quality and accuracy of acquiring initial environmental information, the control circuit can acquire the initial environmental information corresponding to the superconducting qubit after the superconducting qubit interacts with the environment for a time period. It should be noted that the present embodiment does not limit a specific time length of the time period, which can be set in any manner in accordance with requirements of any specific application and design. For example, the time period can be preset as 10 nanoseconds (ns), 20 ns, 30 ns, 50 ns, 100 ns, or any duration of time, which is not limited in this disclosure.

In some embodiments, when the control circuit acquires the initial environmental information corresponding to the superconducting qubit, the control circuit can control the superconducting qubit to be in a preset superposition state, determine a post-interaction qubit corresponding to the superconducting qubit after the superconducting qubit interacts with the environment for a time period, and acquire initial environmental information corresponding to the post-interaction qubit.

For example, the preset superposition state can be a combined quantum state composed of a ground state and an excited state. After the superconducting circuit generates a superconducting qubit (e.g., superconducting qubit 204 in FIG. 2A), the superconducting qubit can be controlled to be in the preset superposition state. After the superconducting qubit interacts with the environment for a time period, a post-interaction qubit (e.g., a superconducting qubit similar to superconducting qubit 212 in FIG. 2A) corresponding to the superconducting qubit can be determined. The post-interaction qubit can carry feature information of the environment.

In some embodiments, when the control circuit acquires initial environmental information corresponding to the post-interaction qubit, the control circuit can send a microwave signal to the superconducting circuit, acquire a microwave feedback signal generated by the superconducting circuit, and determine the initial environmental information corresponding to the post-interaction qubit based on the microwave signal and the microwave feedback signal.

For example, to determine the initial environmental information corresponding to the post-interaction qubit, the control circuit can send the microwave signal to the superconducting circuit. After the superconducting circuit receives the microwave signal, the superconducting circuit can generate a microwave feedback signal corresponding to the microwave signal and send the microwave feedback signal to the control circuit. The control circuit can then analyze and process the microwave signal and the microwave feedback signal to determine the initial environmental information corresponding to the post-interaction qubit.

In some embodiments, when acquiring the first environmental information and the second environmental information, the control circuit can obtain the first environmental information and the second environmental information by a specific mode for acquiring the initial environmental information. For example, under a preset condition that the quantum energy level of the superconducting qubit is a first preset energy level, the control circuit can control the superconducting qubit to be in a preset superposition state. After the superconducting qubit interacts with the environment for a time period, the control circuit can determine a second post-interaction qubit corresponding to the superconducting qubit, and then acquire first environmental information corresponding to the second post-interaction qubit. In some embodiments, when acquiring the first environmental information corresponding to the second post-interaction qubit, the control circuit can send a microwave signal to the superconducting circuit, acquire a microwave feedback signal generated by superconducting circuit 101, and determine the first environmental information corresponding to the second post-interaction qubit based on the microwave signal and the microwave feedback signal.

In some embodiments, under a preset condition that the quantum energy level of the superconducting qubit is a second preset energy level, the control circuit can control the superconducting qubit to be in a preset superposition state. After the superconducting qubit interacts with the environment for a time period, the control circuit can determine a third post-interaction qubit corresponding to the superconducting qubit, and then acquire second environmental information corresponding to the third post-interaction qubit. For example, when acquiring the second environmental information corresponding to the third post-interaction qubit, the control circuit can send a microwave signal to the superconducting circuit, acquire a microwave feedback signal generated by the superconducting circuit, and determine the second environmental information corresponding to the third post-interaction qubit based on the microwave signal and the microwave feedback signal.

By sending the microwave signal to the superconducting circuit, acquiring the microwave feedback signal generated by the superconducting circuit, and analyzing and processing the microwave signal and the microwave feedback signal, the initial environmental information corresponding to the post-interaction qubit can be determined, which can enhance the accuracy and reliability of acquiring the initial environmental information.

In some embodiments, before controlling the superconducting qubit to be in a preset superposition state, the control circuit can initialize the superconducting circuit so that the superconducting qubit generated by the superconducting circuit is in a ground state or an excited state.

The ground state, as used herein, can refer to an eigenstate corresponding to the lowest energy level of a quantum system. The excited state in this disclosure can refer to an eigenstate corresponding to a higher energy level of the system. In some embodiments, when a superconducting circuit (e.g., superconducting circuit 101) is initialized, the superconducting qubit generated by the superconducting circuit can be controlled to be in a ground state. After such initialization, the superconducting qubit can be controlled to be in a preset superposition state. After the superconducting qubit interacts with the environment for a time period, the control circuit can determine a post-interaction qubit corresponding to the superconducting qubit, and acquire initial environmental information corresponding to the post-interaction qubit.

In some embodiments, when the superconducting circuit is initialized, the superconducting qubit generated by the superconducting circuit can be controlled to be in a preset excited state. After such initialization, the superconducting qubit can be controlled to be in a preset superposition state. After the superconducting qubit interacts with the environment for a time period, the control circuit can determine a post-interaction qubit corresponding to the superconducting qubit, and acquire initial environmental information corresponding to the post-interaction qubit.

By way of example, with reference to FIGS. 1-2B, in some embodiments, when the control circuit (e.g., control circuit 102) determines effective environmental information based on the first environmental information and the second environmental information, the control circuit can acquire a first energy level of the superconducting qubit corresponding to the first environmental information and a second energy level of the superconducting qubit corresponding to the second environmental information. The control circuit can determine the first environmental information as the effective environmental information when the first energy level is the same as the first preset energy level. The control circuit can determine the second environmental information as the effective environmental information when the second energy level is the same as the second preset energy level.

For example, assuming the first preset energy level is the ground state and the second preset energy level is the excited state, under a preset condition that the quantum energy level of the superconducting qubit is the ground state, the control circuit can determine the first environmental information and the first energy level corresponding to the superconducting qubit. Under a preset condition that the quantum energy level of the superconducting qubit is the excited state, the control circuit can determine the second environmental information and the second energy level corresponding to the superconducting qubit. Then, the control circuit can analyze and identify the first energy level and the second energy level. When the first energy level is the ground state, the preset condition that the quantum energy level of the superconducting qubit is the ground state is met, and the preset condition that the quantum energy level of the superconducting qubit is the excited state is not met. Then, the control circuit can determine the first environmental information as the effective environmental information. In another example, when the second energy level is the excited state, the preset condition that the quantum energy level of the superconducting qubit is the excited state is met, and the preset condition that the quantum energy level of the superconducting qubit is the ground state is not met. Then, the control circuit can determine the second environmental information as effective environmental information.

By way of example, with reference to FIGS. 1-2B, consistent with some embodiments of this disclosure, the control circuit (e.g., control circuit 102) can further acquire error information corresponding to the effective environmental information, and process the arbitrary-order correlation information based on the error information to obtain target correlation information for identifying an environmental noise.

Error information may be obtained in the data processing process for acquiring the effective environmental information. To ensure the accuracy and reliability of acquiring arbitrary-order correlation information, the control circuit can acquire the error information corresponding to the effective environmental information, process the obtained arbitrary-order correlation information based on the error information, and obtain target correlation information for identifying an environmental noise.

For example, when the control circuit processes the arbitrary-order correlation information based on the error information to obtain the target correlation information, the control circuit can determine, based on the error information, a correction factor corresponding to the arbitrary-order correlation information, and determine a ratio of the arbitrary-order correlation information to the correction factor as the target correlation information.

Consistent with some embodiments of this disclosure, after obtaining the error information, the control circuit can analyze and process the error information to determine a correction factor corresponding to the arbitrary-order correlation information. For example, when the control circuit determines, based on the error information, the correction factor corresponding to the arbitrary-order correlation information, the control circuit 102 can acquire a product of the error information and a preset coefficient, and determine a difference between 1 and the product as a correction factor corresponding to the arbitrary-order correlation information.

For example, the preset coefficient can be parameter information for the error information. The present embodiment does not limit a specific value range of the preset coefficient, which can be set based on requirements of any specific application and design. By way of example, the preset coefficient can be 2, 3, 4, 5, or any number. After the preset coefficient is determined, the control circuit can acquire a product of the error information and the preset coefficient, and determine a difference between 1 and the product as a correction factor corresponding to the arbitrary-order correlation information. For example, the error information can be represented as Pe, and the preset coefficient can be 2. The product can be 2Pe, and then the correction factor can be determined as (1-2Pe).

Consistent with some embodiments of this disclosure, after obtaining the correction factor, the control circuit can determine a ratio of the arbitrary-order correlation information to the correction factor as the target correlation information. For example, assuming the arbitrary-order correlation information is L, after obtaining the arbitrary-order correlation information and the correction factor (1-2Pe), the control circuit can determine the target correlation information as $$\frac{L}{1-2Pe}.$$

Acquiring error information corresponding to the effective environmental information and processing the arbitrary-order correlation information based on the error information to obtain target correlation information for identifying an environmental noise can ensure the accuracy and reliability of analysis and identification of the environmental noise based on the target correlation information, improve the accuracy and reliability of acquiring the arbitrary-order correlation information, and further improve the use accuracy and reliability of measurement system 100.

Figure 2C:
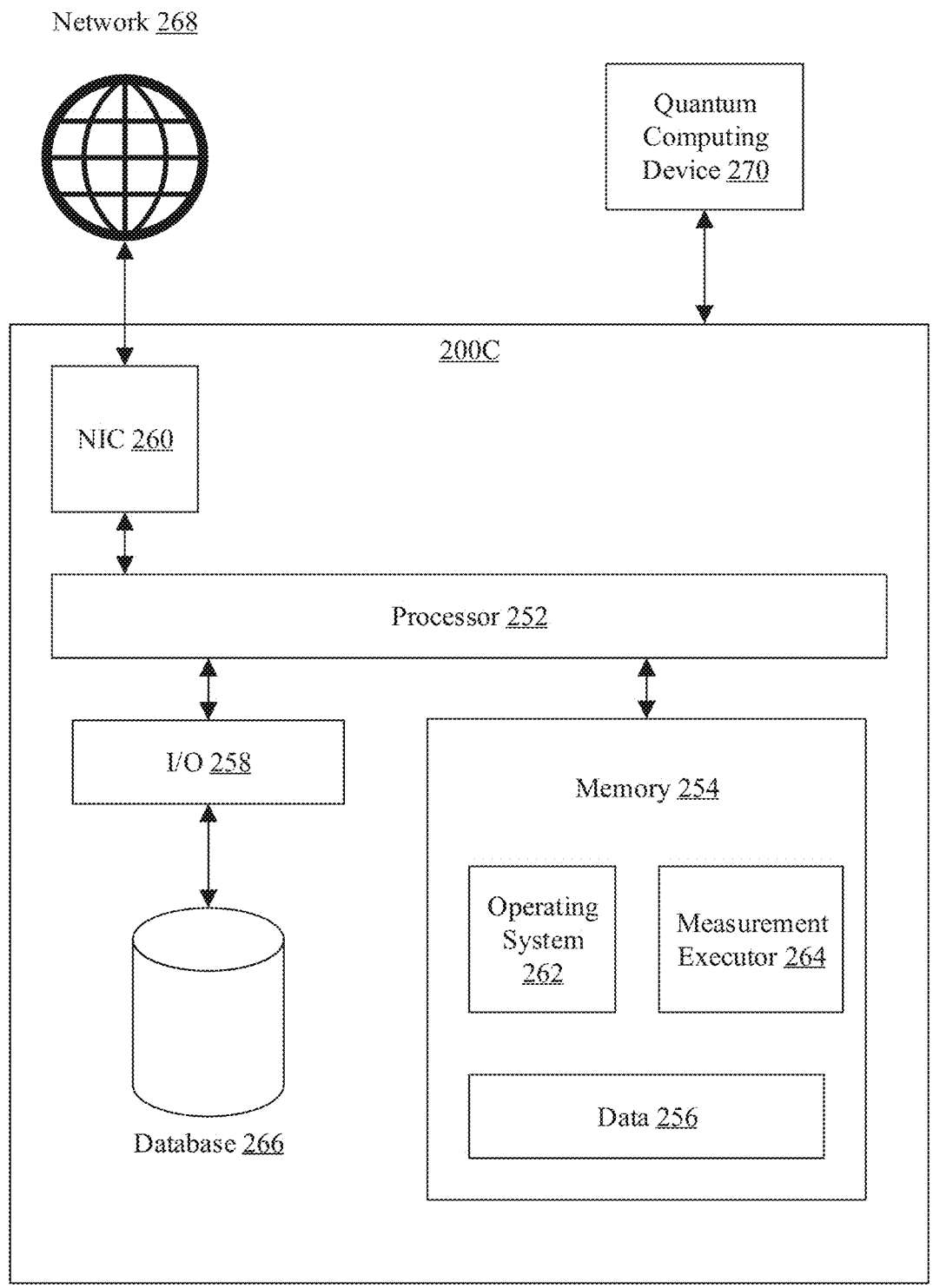
FIG. 2C is a block diagram of an example apparatus for measurement, consistent with some embodiments of this disclosure.

FIG. 2C is a block diagram of an example apparatus 200C for measurement, consistent with some embodiments of this disclosure. For example, control circuit 102 of FIG. 1 can include part or all of apparatus 200C. In another example, apparatus 200C can include part or all of control circuit 102 of FIG. 1. In some embodiments, apparatus 200C can include a computer (e.g., a classical computer) configured to execute operations as described in association with FIGS. 1-2B. As depicted in FIG. 2C, apparatus 200C includes a processor 252 that can be in operable connection with a memory 254, an input/output (I/O) module 256, and a network interface controller (NIC) 260.

When processor 252 executes instructions described herein, apparatus 200C can become a specialized machine for measurement. Processor 252 can be any type of circuitry capable of manipulating or processing information. For example, processor 252 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 252 can also be a set of processors (not shown in FIG. 2C) grouped as a single logical component.

Memory 254 can include a single memory or a plurality of memories that can be configured to store data 256 (e.g., a set of instructions, computer codes, intermediate data, or data for output). Memory 254 can include a high-speed random-access storage device or a non-volatile storage device. In some embodiments, memory 254 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 254 can also be a group of memories (not shown in FIG. 2C) grouped as a single logical component. Processor 252 can access the program instructions and data 256, and execute the program instructions to perform an operation or manipulation on data 256. As depicted in FIG. 2C, memory 254 can store an operating system 262 and a measurement executor 264. For example, measurement executor 264 can include instructions to implement the method described in association with FIGS. 1-2B.

For ease of explanation without causing ambiguity, processor 252 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 200C. For example, control circuit 102 of FIG. 1 can include the data processing circuit.

Input/output module (I/O) 258 can store and retrieve data from a database 266. For example, database 266 can include data structures describing quantum circuits and data structures describing quantum gates. NIC 260 can provide wired or wireless communication between apparatus 200C and a network 268 (e.g., an internet, an intranet, a local area network, a mobile communications network, or any type of network). Apparatus 200C can receive data and instructions over a network using NIC 260 and can transmit data and instructions over a network using NIC 260. In some embodiments, NIC 260 can include any combination of a radio frequency (RF) module, a transponder, a transceiver, a modem, a router, a gateway, a wired network adapter, a wireless network adapter, a Bluetooth adapter, an infrared adapter, a near-field communication ("NFC") adapter, or a cellular network chip.

As depicted in FIG. 2C, apparatus 200C can also communicatively couple with (e.g., via I/O 258 or NIC 260) a quantum computing device 270. For example, superconducting circuit 101 of FIG. 1 can include part or all of quantum computing device 270. In another example, quantum computing device 270 can include part or all of superconducting circuit 101 of FIG. 1. In some embodiments, apparatus 200C can be a classical computer (e.g., a desktop computer, a laptop computer, or a tablet computer) that is independent from quantum computing device 270. In some embodiments, apparatus 200C can include classical computing devices (e.g., processor 252, memory 254, I/O 258, NIC 260, or database 266) and quantum computing devices (e.g., including quantum computing device 270). Quantum computing device 270 can include any number of any type of quantum circuits (that include quantum gates) for operating on qubits as well as peripheral devices (e.g., cryostats, laser generators, electric oscillators) for maintaining and supporting the quantum circuits. In some embodiments, quantum computing device 270 can include hardware components functioning as a quantum data plane for preparing and storing qubits, a control and measurement plane for executing operations on the qubits and measuring the resulting qubits, and a control processor plane for determining the sequence of operations and measurements based on an algorithm or measurement outcomes. For example, quantum computing device 270 can additionally include feedback circuit 103 of FIG. 1, refrigerator 104 of FIG. 1, or both. When apparatus 200C is a classical computer, it can assist quantum computing device 270 for network access (e.g., via NIC 260), large storages (e.g., using database 260), and user interactions (e.g., via I/O 258).

By way of example, FIGS. 3-13 illustrate flowcharts and diagrams of example measurement methods 300-1300, consistent with some embodiments of this disclosure. Methods 300-1300 can be performed by at least one data processing circuit (e.g., processor 252 in FIG. 2C). For example, methods 300-1300 can be executed by a control circuit (e.g., by control circuit 102 in FIG. 1 or 2B) of a measurement system (e.g., measurement system 100 in FIG. 1). In some embodiments, methods 300-1300 can be implemented as a computer program product (e.g., embodied in a computer-readable medium) that includes computer-executable instructions (e.g., program codes) to be executed by a computer (e.g., apparatus 200C in FIG. 2C). In some embodiments, methods 300-1300 can be implemented as a hardware product (e.g., measurement executor 264 in FIG. 2C) that stores computer-executable instructions (e.g., program codes), and the hardware product can be a standalone or integrated part of any of apparatus 200C.

Figure 3:
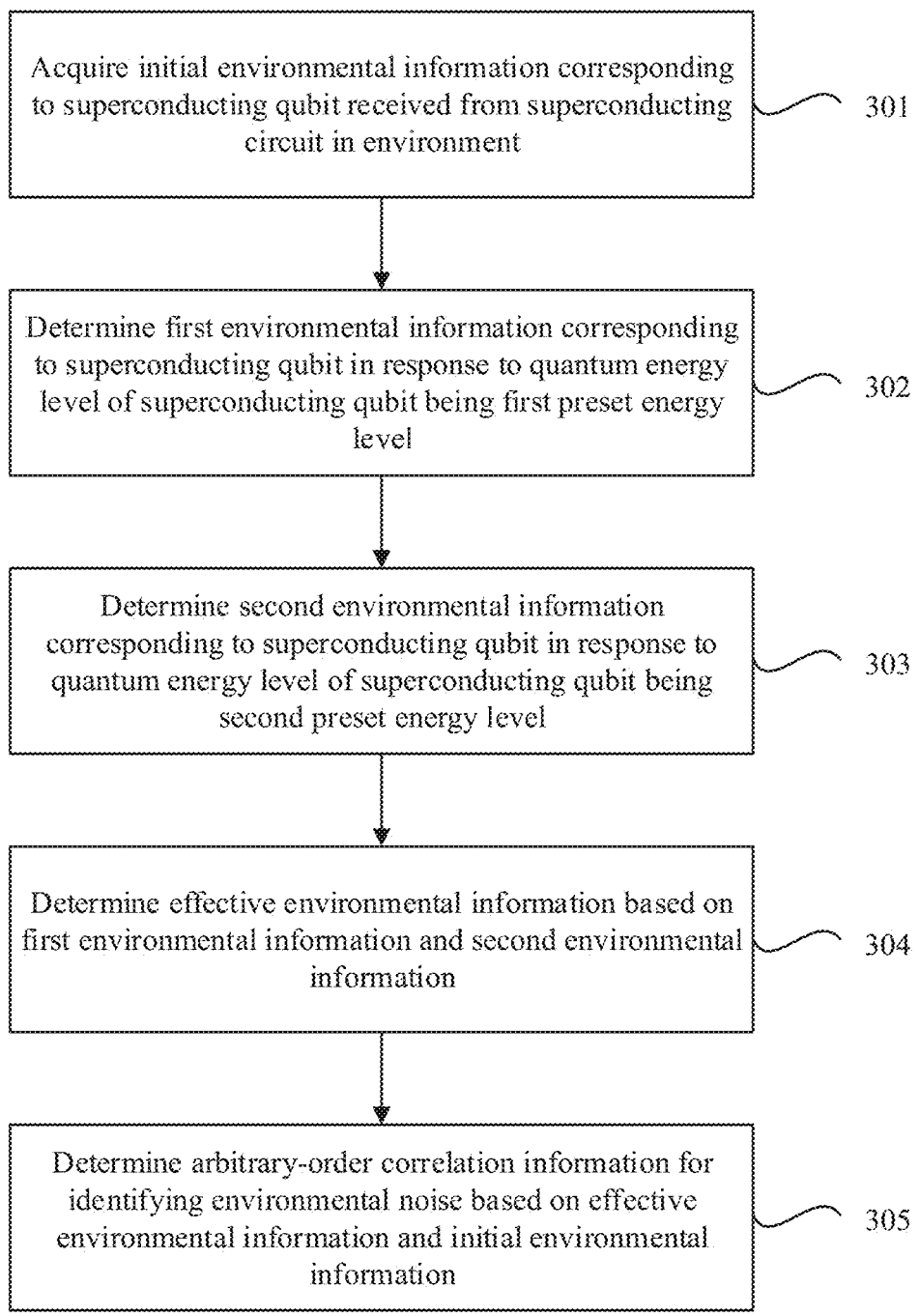
FIG. 3 is a flowchart of an example measurement method, consistent with some embodiments of the present disclosure.

By way of example, FIG. 3 is a flowchart of an example measurement method 300, consistent with some embodiments of the present disclosure. Referring to FIG. 3, at step 301, a control circuit (e.g., control circuit 102 in FIG. 1) can acquire initial environmental information (e.g., initial environmental information 202 in FIG. 2A) corresponding to a superconducting qubit (e.g., superconducting qubit 204 in FIG. 2A) received from a superconducting circuit (e.g., superconducting circuit 101 in FIG. 1). The superconducting circuit can be in an environment (e.g., environment 105 in FIGS. 1-2A). The term "acquiring," as used herein, may refer to receiving, accepting, taking in, admitting, gaining, retrieving, obtaining, reading, accessing, collecting, or any operation for inputting.

In some embodiments, the superconducting circuit can generate the superconducting qubit in the environment. For example, the environment can include a low temperature environment for operating the superconducting circuit normally. In some embodiments, the initial environmental information can include at least one of information about an initial magnetic flux in the environment, information about an initial electric field in the environment, or fluctuation information about an initial quantum noise in the environment.

In some embodiments, to acquire the initial environmental information, the control circuit can acquire the initial environmental information corresponding to the superconducting qubit after the superconducting qubit interacts with the environment for a time period (e.g., 10 ns, 20 ns, 30 ns, 50 ns, 100 ns, or any duration of time). By way of example, FIG. 4 is a flowchart of an example method 400 for acquiring initial environmental information corresponding to a superconducting quantum bit, consistent with some embodiments of the present disclosure.

Figure 4:
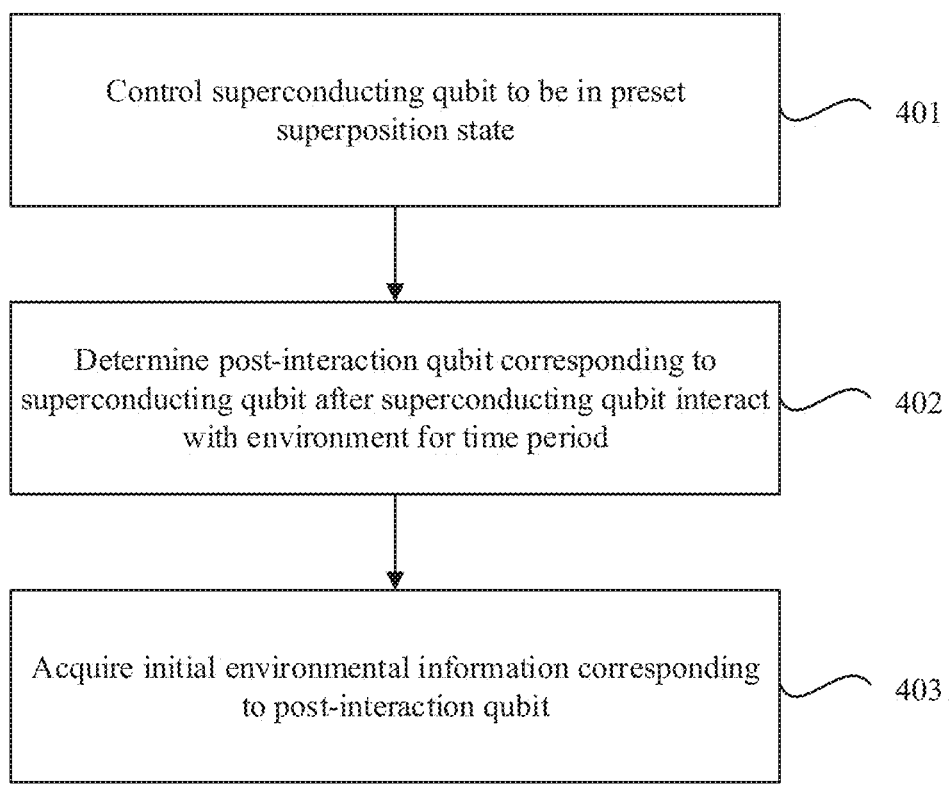
FIG. 4 is a flowchart of an example method for acquiring initial environmental information corresponding to a superconducting quantum bit, consistent with some embodiments of the present disclosure.

Referring to FIG. 4, at step 401, the control circuit can control the superconducting qubit (e.g., superconducting qubit 204 in FIG. 2A) to be in a preset superposition state. For example, the preset superposition state can include a quantum state in combination of a ground state and an excited state. At step 402, the control circuit can determine a post-interaction qubit (e.g., a superconducting qubit similar to superconducting qubit 212 in FIG. 2A) corresponding to the superconducting qubit after the superconducting qubit interacts with the environment (e.g., environment 105 in FIG. 2A) for the time period. At step 403, the control circuit can acquire the initial environmental information corresponding to the post-interaction qubit. In some embodiments, before step 401, the control circuit can initialize the superconducting circuit to generate the superconducting qubit being in a ground state or an excited state.

Still referring to FIG. 4, in some embodiments, to implement step 403, the control circuit may use microwave signals. By way of example, FIG. 5 is a flowchart of an example method 500 for acquiring initial environmental information corresponding to a post-interaction quantum bit, consistent with some embodiments of the present disclosure.

Figure 5:
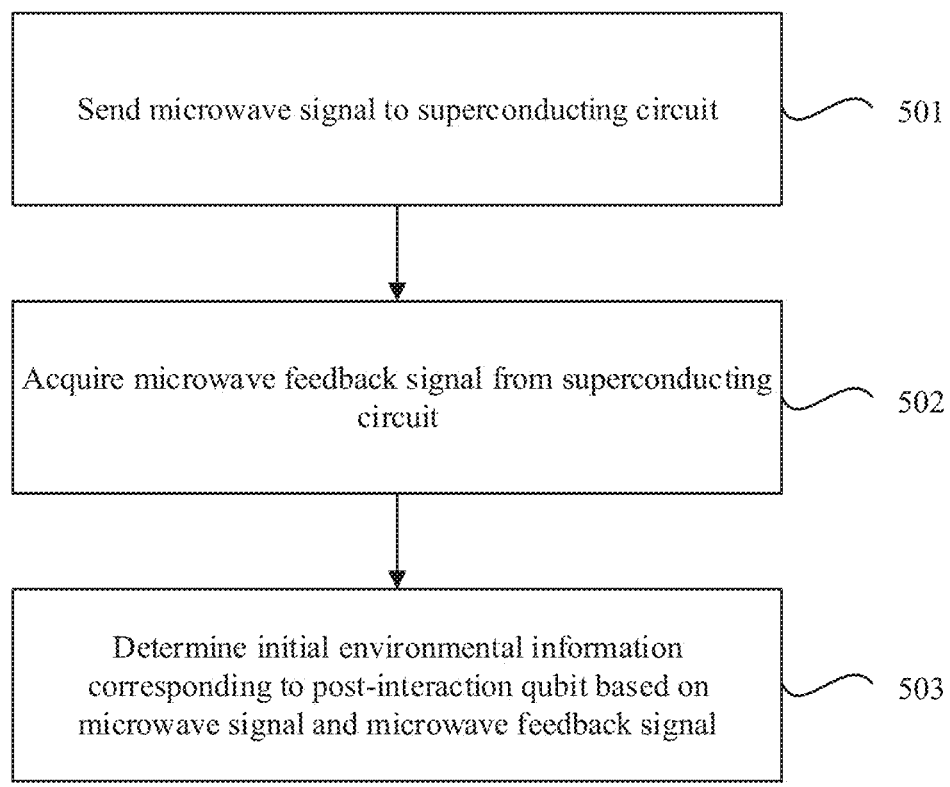
FIG. 5 is a flowchart of an example method for acquiring initial environmental information corresponding to a post-interaction quantum bit, consistent with some embodiments of the present disclosure.

Referring to FIG. 5, at step 501, the control circuit can send a microwave signal to the superconducting circuit. At step 502, the control circuit can acquire a microwave feedback signal from the superconducting circuit. At step 503, the control circuit can determine the initial environmental information corresponding to the post-interaction qubit based on the microwave signal and the microwave feedback signal.

Referring back to FIG. 3, at step 302, the control circuit can determine first environmental information (e.g., first environmental information 216 in FIG. 2A) corresponding to the superconducting qubit in response to a quantum energy level of the superconducting qubit being a first preset energy level (e.g., a ground state |0) or an excited state |1)). In some embodiments, the first environmental information can include at least one of information about a first magnetic flux in the environment, information about a first electric field in the environment, or fluctuation information about a first quantum noise in the environment. In some embodiments, the first preset energy level can include a ground state or an excited state.

At step 303, the control circuit can determine second environmental information (e.g., second environmental information 222 in FIG. 2A) corresponding to the superconducting qubit in response to the quantum energy level of the superconducting qubit being a second preset energy level (e.g., an excited state |1) or a ground state |0) ). In some embodiments, the second environmental information can include at least one of information about a second magnetic flux in the environment, information about a second electric field in the environment, or fluctuation information about a second quantum noise in the environment. In some embodiments, the second preset energy level can include the excited state or the ground state, and the second preset energy level can be different from the first preset energy level. For example, when the first preset energy level is the ground state (e.g., |0) ), the second preset energy level can be the excited state (e.g., |1) ). In another example, when the first preset energy level is the excited state (e.g., |1) ), the second preset energy level can be the ground state (e.g., |0) ).

In some embodiments, the quantum energy level of the superconducting qubit at steps 302-303 can include at least one of a ground state or an excited state. For example, after the superconducting qubit interacts with the environment, its quantum energy level can be in the ground state or the excited state.

Figure 6:
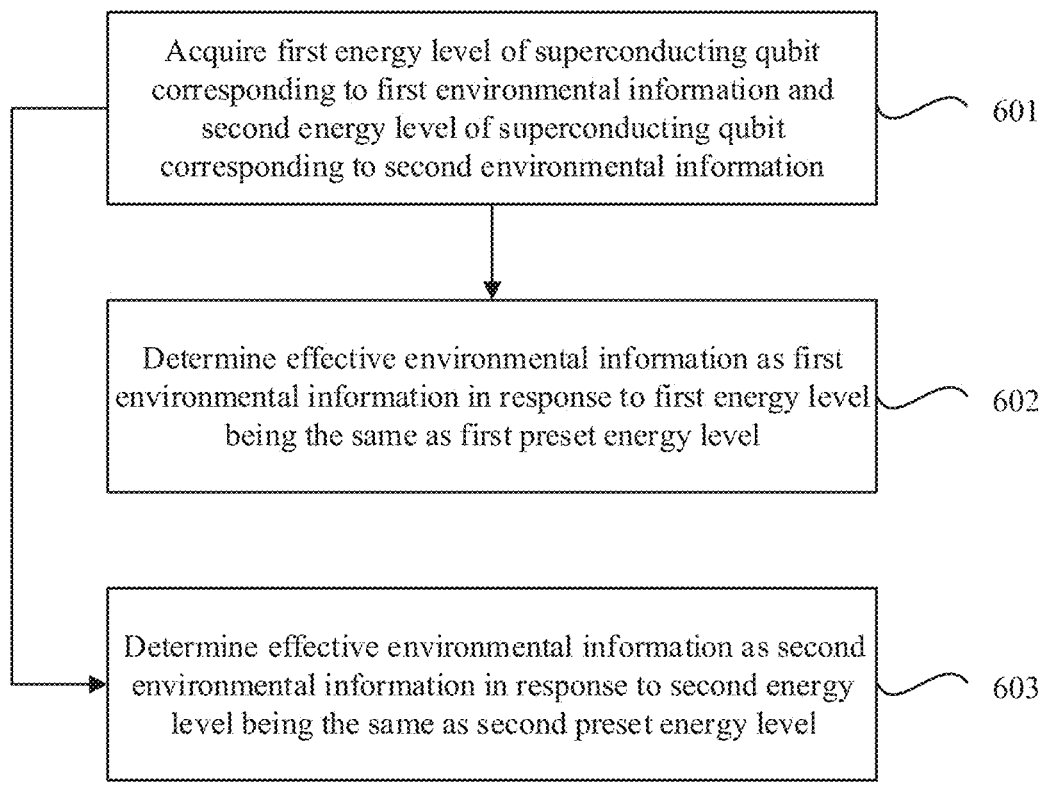
FIG. 6 is a flowchart of an example method for determining effective environmental information, consistent with some embodiments of the present disclosure.

At step 304, the control circuit can determine effective environmental information (e.g., effective environmental information 224 in FIG. 2A) based on the first environmental information and the second environmental information. By way of example, FIG. 6 is a flowchart of an example method 600 for determining effective environmental information, consistent with some embodiments of the present disclosure. Method 600 can be used to implement step 304.

Referring to FIG. 6, at step 601 the control circuit can acquire a first energy level (e.g., represented as $|\psi_1\rangle$, such as first energy level 214 in FIG. 2A) of the superconducting qubit corresponding to the first environmental information (e.g., first environmental information 216 in FIG. 2A) and a second energy level (e.g., represented as $|\psi_2\rangle$, such as second energy level 220 in FIG. 2A) of the superconducting qubit corresponding to the second environmental information (e.g., second environmental information 222 in FIG. 2A). At step 602, the control circuit can determine the effective environmental information (e.g., effective environmental information 224 in FIG. 2A) as the first environmental information in response to the first energy level (e.g., $|\psi_1\rangle$) being the same as the first preset energy level (e.g., |0) ). Alternatively, at step 603, the control circuit can determine the effective environmental information as the second environmental information in response to the second energy level (e.g., $|\psi_2\rangle$) being the same as the second preset energy level (e.g., |1) ).

Referring back to FIG. 3, at step 305, the control circuit can determine arbitrary-order correlation information (e.g., arbitrary-order correlation information 226 in FIG. 2A) for identifying an environmental noise based on the effective environmental information and the initial environmental information. In some embodiments, the arbitrary-order correlation information can include second-order correlation information. In some embodiments, to implement step 305, the control circuit can determine an inner product of the effective environmental information and the initial environmental information as the second-order correlation information. It should be noted that the arbitrary-order correlation information can also include third-order correlation information, fourth-order correlation information, or any multi-order correlation information.

In some embodiments, after step 305, the control circuit can identify a noise spectral density of the superconducting qubit using the second-order correlation information. In some embodiments, a refrigerator electrically connected to the control circuit can cause the superconducting circuit to be in the environment under control of the control circuit.

Figure 7:
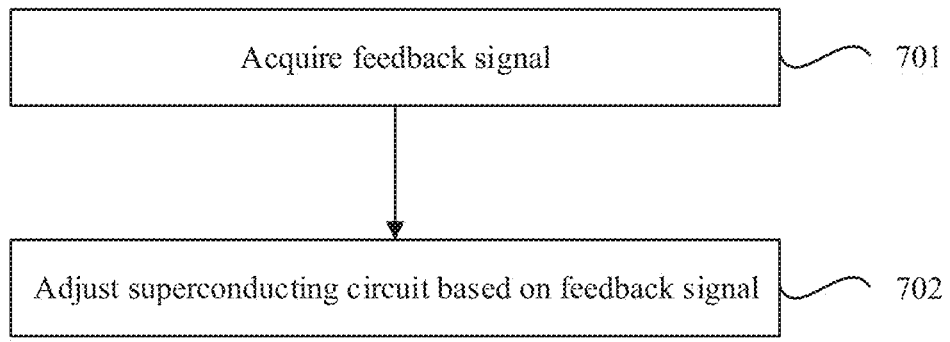
FIG. 7 is a flowchart of an example method for adjusting a superconducting circuit, consistent with some embodiments of the present disclosure.

Consistent with some embodiments of this disclosure, method 300 can include additional steps or operations. By way of example, FIG. 7 is a flowchart of an example method 700 for adjusting a superconducting circuit, consistent with some embodiments of the present disclosure. Method 300 can include method 700 as additional operations or steps.

Referring to FIG. 7, at step 701, the control circuit can acquire a feedback signal. The feedback signal can correspond to the first preset energy level in response to the quantum energy level of the superconducting qubit not being the first preset energy level. The feedback signal can correspond to the second preset energy level in response to the quantum energy level of the superconducting qubit not being the second preset energy level. In some embodiments, the feedback signal can include a NOT-gate signal for adjusting the superconducting qubit.

In some embodiments, a feedback circuit (e.g., feedback circuit 103 in FIG. 1) electrically connected to the control circuit can generate the feedback signal. For example, the feedback circuit can generate the feedback signal corresponding to the first preset energy level in response to the quantum energy level of the superconducting qubit not being the first preset energy level. The feedback circuit can generate the feedback signal corresponding to the second preset energy level in response to the quantum energy level of the superconducting qubit not being the second preset energy level.

Still referring to FIG. 7, at step 702, the control circuit can adjust the superconducting circuit based on the feedback signal. The quantum energy level of the superconducting qubit can be at the first preset energy level or the second preset energy level.

Figure 8:
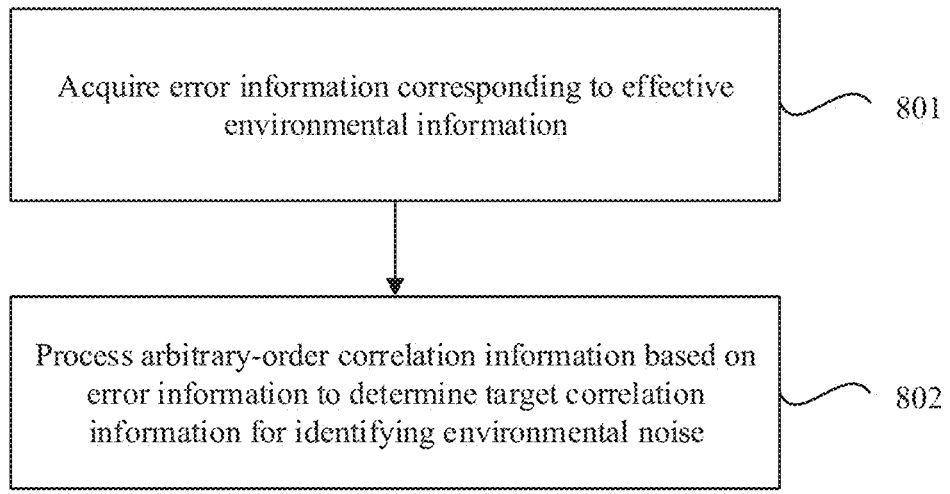
FIG. 8 is a flowchart of an example method for processing arbitrary-order correlation information, consistent with some embodiments of the present disclosure.

By way of example, FIG. 8 is a flowchart of an example method 800 for processing arbitrary-order correlation information, consistent with some embodiments of the present disclosure. Method 300 can include method 800 as additional operations or steps. Referring to FIG. 8, at step 801, the control circuit can acquire error information corresponding to the effective environmental information.

At step 802, the control circuit can process the arbitrary-order correlation information based on the error information to determine target correlation information for identifying the environmental noise. In some embodiments, to process the arbitrary-order correlation information, the control circuit can determine, based on the error information, a correction factor corresponding to the arbitrary-order correlation information. The control circuit can then determine a ratio of the arbitrary-order correlation information to the correction factor as the target correlation information.

Still referring to FIG. 8, for example, to determine the correction factor, the control circuit can acquire a product of the error information and a preset coefficient (e.g., 2, 3, 4, 5, or any number). Assuming the error information as Pe and the preset coefficient being 2, the product can be represented as 2Pe. Then, the control circuit can determine a difference between 1 and the product as the correction factor corresponding to the arbitrary-order correlation information. For example, the correction factor can be determined as (1-2Pe). Assuming that the arbitrary-order correlation information is L, after obtaining the arbitrary-order correlation information L and the correction factor (1-2Pe), the control circuit can determine the target correlation information $$\frac{L}{1-2Pe}.$$

This disclosure also provides technical solutions for determining measurement result of the superconducting qubit using a post-selection mode. Consistent with some embodiments of this disclosure, a control circuit (e.g., control circuit 102 in FIG. 1) can control a superconducting qubit (e.g., superconducting qubit 204 in FIG. 2A) generated by a superconducting circuit (e.g., superconducting circuit 101 in FIG. 1) to be in a ground state (e.g., a stable state represented as $|0\rangle$).

In some embodiments, to control the superconducting qubit to be in the ground state, a measurement system (e.g., measurement system 100 in FIG. 1) can be initialized so that the superconducting circuit can generate the superconducting qubit in a low temperature environment. Then, the control circuit can control the superconducting qubit to be in the ground state. For example, for such controlling, the control circuit can apply a beam of microwave signal on the superconducting circuit. The superconducting circuit can generate a microwave feedback signal corresponding to the microwave signal. The microwave feedback signal can change relative to the microwave signal. The change between the microwave feedback signal and the microwave signal can be used for identifying whether the superconducting qubit is in the ground state or an excited state. In some embodiments, if the superconducting qubit is not in the ground state, to ensure the accuracy of measurement of arbitrary-order correlation information, the measurement system can be controlled to perform initialization operations, by which the superconducting qubit generated by the superconducting circuit can be in the ground state.

Consistent with some embodiments of this disclosure, after controlling or initializing the superconducting qubit to be in the ground state, the control circuit can control (e.g., using a microwave signal) the superconducting qubit to be in a preset initial superposition state. Depending on different application scenarios, the superconducting qubit can correspond to different initial superposition states. The initial superposition state can be a superposition state combined by a preset ground state and a preset excited state. For ease of description, a relationship between the initial superposition state, the ground state, and the excited state can be expressed by $|\psi_i\rangle = \alpha|0\rangle + \beta|1\rangle$ where $|\psi_i\rangle$ represents the initial superposition state, $|0\rangle$ represents the ground state, $|1\rangle$ represents the excited state, and $\alpha$ and $\beta$ represent amplitudes (e.g., complex numbers) satisfying $|\alpha|^2+|\beta|^2=1$. For example, the initial superposition state can be a superposition state $|\psi_i\rangle = 0.8|0\rangle + 0.6|1\rangle$.

Consistent with some embodiments of this disclosure, after controlling the superconducting qubit to be in the preset initial superposition state, a post-interaction qubit (e.g., the post-interaction qubit as illustrated and described in association with FIG. 4) can form from the superconducting qubit after the superconducting qubit interacts with an environment (e.g., environment 105 in FIG. 2A) for a time period (e.g., e.g., 10 ns, 20 ns, 30 ns, 50 ns, 100 ns, or any duration of time). The control circuit can measure the post-interaction qubit. The measurement result of the post-interaction qubit can include information about the environment. In some embodiments, the measured post-interaction qubit can be in a ground state or an excited state.

In some embodiments, within a time range, the longer time for which the superconducting qubit interacts with the environment, the more environmental information can be carried by the measured post-interaction qubit. When the time range is exceeded, the environmental information carried by the measured post-interaction qubit can gradually decrease due to decorrelation of the post-interaction qubit. Such a time range can depend on requirements of specific applications and designs of the measurement system. Therefore, the time period for which the superconducting qubit interacts with the environment can be preset as a specific time length shorter than the time range. By measuring the post-interaction qubit before exceeding the time range, the accuracy and reliability of measurement of the initial environmental information can be ensured.

In some embodiments, based on inputted (e.g., by a user) requirements of an application or design, the measurement system can automatically determine the time period for which the superconducting qubit interacts with the environment. For example, the determined time period can be shorter than the time range corresponding to the inputted requirements. In some embodiments, the measurement system can include a machine learning model for determining the time period. The machine learning model can receive at least one of design requirement information, application requirement information, or application scenario information, and then output the time period. The machine learning model can be trained to identify the time period using training data that includes associated inputted information and corresponding time periods.

Consistent with some embodiments of this disclosure, after measuring the post-interaction qubit, the control circuit can determine initial environmental information (e.g., represented as $|m\rangle$) based on the measured post-interaction qubit. For example, the initial environmental information can include change information about a magnetic flux, change information about an electric field, fluctuation information about a quantum noise, or any information about any physical quantity in the environment. The change information about the magnetic flux can cause the phase of an excess qubit to fluctuate (e.g., the phase of the superconducting qubit being changed from 0 degree to 10 degrees). The initial environmental information can be obtained through the measured post-interaction qubit. In some embodiments, the control circuit can apply a microwave signal on the superconducting qubit (e.g., by performing operations of step 501 in FIG. 5), and obtain a microwave feedback signal sent by the superconducting qubit (e.g., by performing operations of step 502 in FIG. 5). Then, the control circuit can determine the initial environmental information $|m\rangle$ based on the microwave signal and the microwave feedback signal (e.g., by performing operations of step 503 in FIG. 5).

Consistent with some embodiments of this disclosure, after determining the initial environmental information, the control circuit can perform a first measurement (e.g., corresponding to operations in first branch 208 of FIG. 2A) on the superconducting. After performing the first measurement, the control circuit can perform a second measurement (e.g., corresponding to operations in second branch 210 of FIG. 2A) on the superconducting qubit. In some embodiments, the control circuit can perform preparation operations before performing the second measurement.

Figure 9:
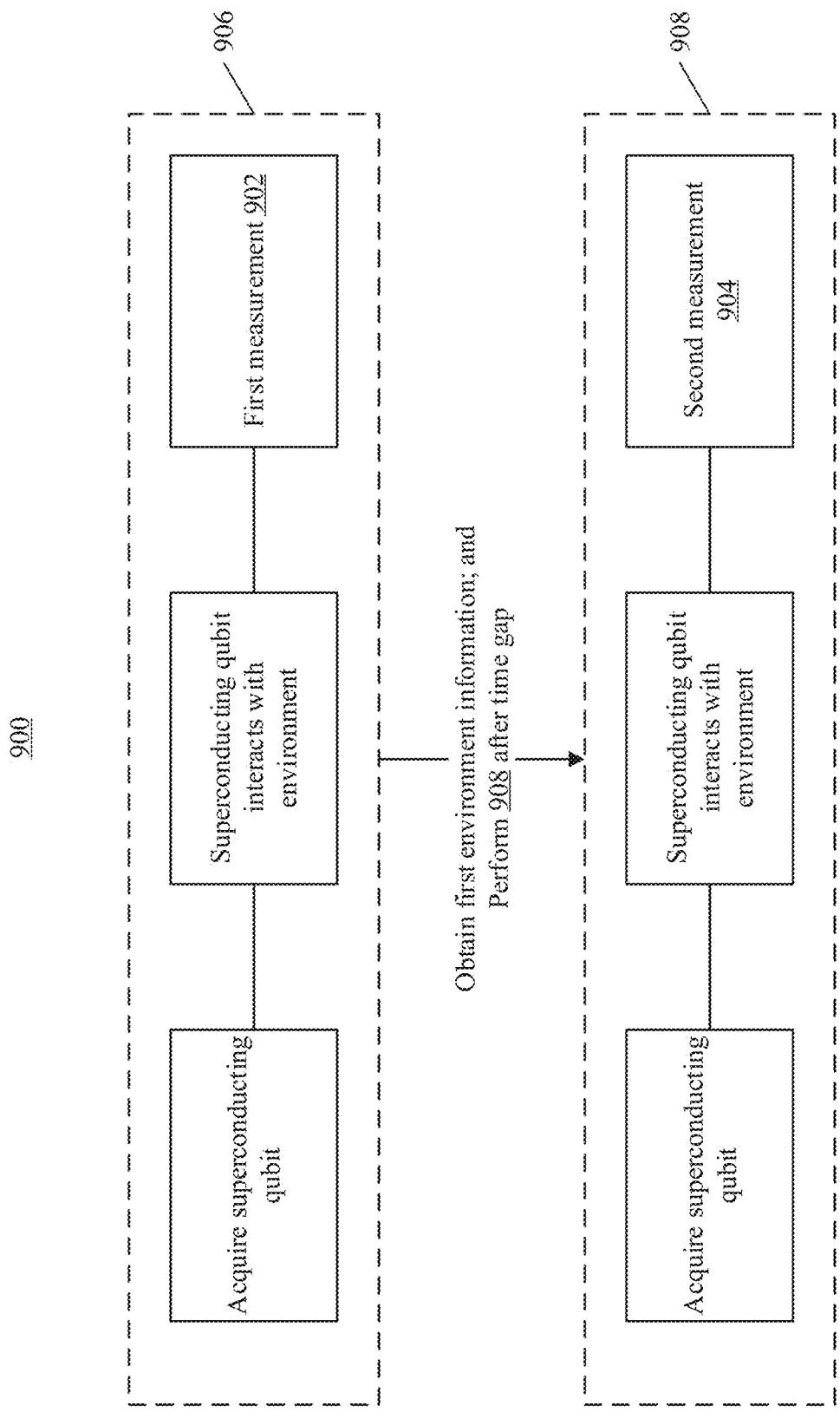
FIG. 9 is a schematic diagram illustrating an example measurement method for an application, consistent with some embodiments of the present disclosure.

By way of example, FIG. 9 is a schematic diagram illustrating an example measurement method 900 for an application, consistent with some embodiments of the present disclosure. For example, first branch 208 as illustrated and described in FIG. 2A can include operations of method 900. Method 900 illustrates a process of measuring a superconducting qubit (e.g., superconducting qubit 204 in FIG. 2A) generated by a superconducting circuit (e.g., superconducting circuit 101 in FIG. 2A) for at least twice, including first measurement 902 and second measurement 904. As shown in FIG. 9, method 900 can perform groups of operations, including first operation group 906 (that includes first measurement 902) and second operation group 908 (that includes second measurement 904). For example, first operation group 906 and second operation group 908 respectively.

As depicted in FIG. 9, in first operation group 906, a control circuit (e.g., control circuit 102 in FIG. 1) of a measurement system (e.g., measurement system 100 in FIG. 1) can acquire the superconducting qubit. For example, a superconducting circuit (e.g., superconducting circuit 101 in FIG. 2A) can generate the superconducting qubit, and the control circuit can initialize it to be a ground state (e.g., $|0\rangle$ ). After the superconducting qubit interacts with an environment (e.g., environment 105 in FIG. 2A) for a time period, the control circuit can measure the superconducting qubit for the first time (e.g., at time T1 in FIG. 2B), the process of which is represented by the block first measurement 902 in FIG. 9. For example, the measured superconducting qubit can be in a ground state (e.g., $|0\rangle$ ) or an excited state (e.g., $|1\rangle$ ) after first measurement 902.

Still referring to FIG. 9, after performing first operation group 906, the control circuit can obtain the first environmental information (e.g., represented as $|n1\rangle$ ) corresponding to the measured superconducting qubit, and can perform second operation group 902 after a time gap. Similar to first operation group 906, the control circuit can acquire the superconducting qubit (e.g., by reusing the measured superconducting qubit after first measurement 902) and measure the superconducting qubit (e.g., at time T2 in FIG. 2B) for the second time after the superconducting qubit interacts with the environment for the time period, the process of which is represented by the block first measurement 904 in FIG. 9. For example, the measured superconducting qubit after second measurement 904 can be in the ground state (e.g., $|0\rangle$ ) or an excited state (e.g., $|1\rangle$ ), which can carry information about the environment.

Figure 10:
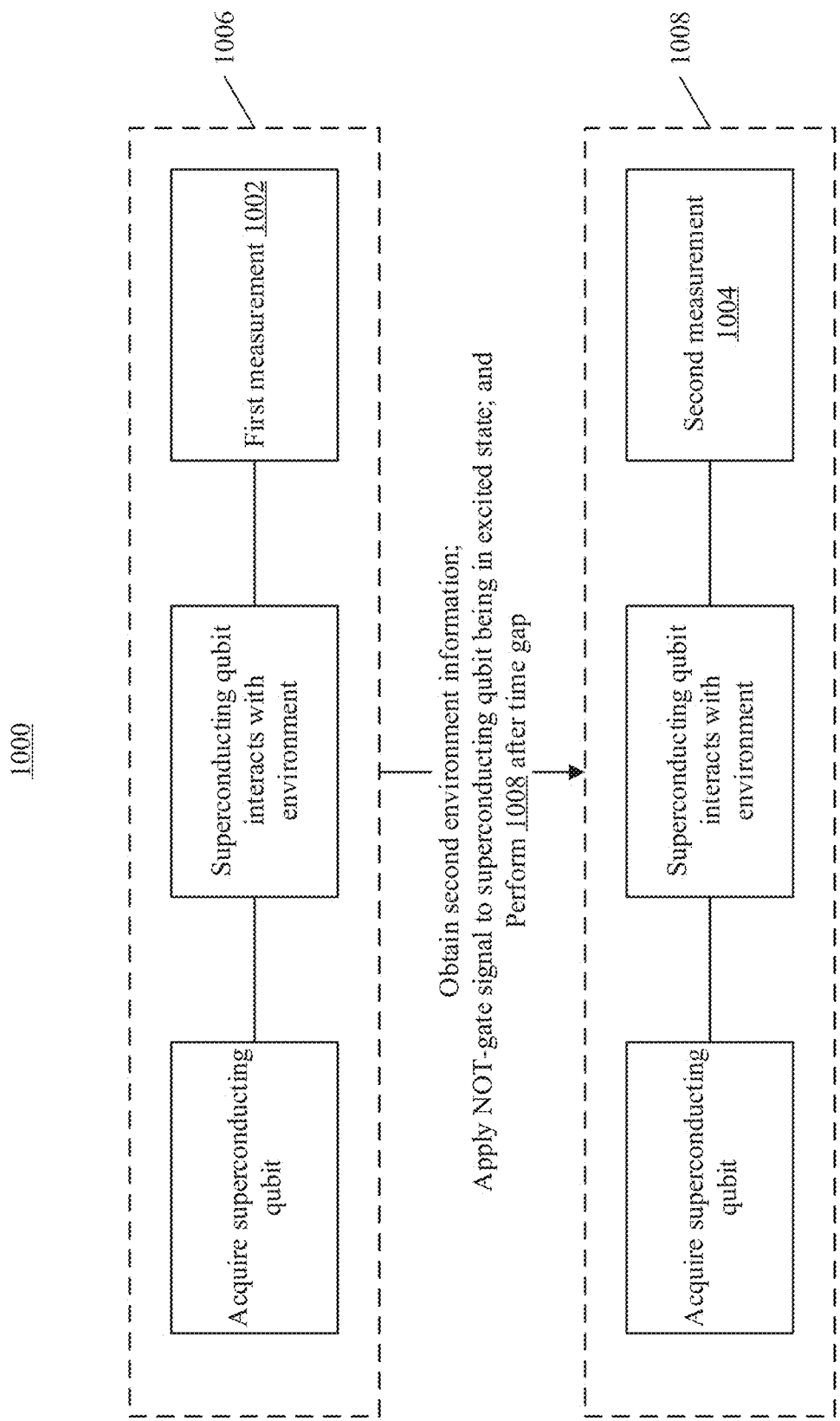
FIG. 10 is a schematic diagram illustrating an example measurement method for another application, consistent with some embodiments of the present disclosure.

By way of example, FIG. 10 is a schematic diagram illustrating an example measurement method 1000 for another application, consistent with some embodiments of the present disclosure. For example, second branch 210 as illustrated and described in FIG. 2A can include operations of method 1000. Method 1000 illustrates a process of measuring a superconducting qubit (e.g., superconducting qubit 204 in FIG. 2A) generated by a superconducting circuit (e.g., superconducting circuit 101 in FIG. 1) for at least twice, including first measurement 1002 and second measurement 1004. In FIG. 10, method 1000 can perform groups of operations, including first operation group 1006 (that includes first measurement 1002) and second operation group 1008 (that includes second measurement 1004). Method 1000 can ensure that the superconducting qubit is initialized to the ground state before each measurement.

As depicted in FIG. 10, in first operation group 1006, a control circuit (e.g., control circuit 102 in FIG. 1) of a measurement system (e.g., measurement system 100 in FIG. 1) can acquire the superconducting qubit. For example, a superconducting circuit (e.g., superconducting circuit 101 in FIG. 2A) can generate the superconducting qubit, and the control circuit can initialize it to be a ground state (e.g., $|0\rangle$). After the superconducting qubit interacts with an environment (e.g., environment 105 in FIG. 2A) for a time period, the control circuit can measure the superconducting qubit for the first time (e.g., at time T7 in FIG. 2B), the process of which is represented by first measurement 1002 in FIG. 10. For example, the measured superconducting qubit can be in a ground state (e.g., $|0\rangle$) or an excited state (e.g., $|1\rangle$) after first measurement 1002.

Still referring to FIG. 10, after performing first operation group 1006, the control circuit can obtain the second environmental information (e.g., represented as $|n2\rangle$) corresponding to the measured superconducting qubit, and apply a NOT-gate signal to the superconducting qubit to initialize the superconducting qubit to the ground state. In some embodiments, a feedback circuit (e.g., feedback circuit 103 in FIG. 1) can be used to generate a feedback for initializing the superconducting qubit. For example, the control circuit can detect (e.g., by using a microwave signal) a state of the superconducting qubit after first measurement 1002. If the superconducting qubit is in the ground state (e.g., $|0\rangle$), the feedback circuit can take no action. If the superconducting qubit is in the excited state (e.g., $|1\rangle$), the feedback circuit can generate and apply the NOT-gate signal to the superconducting circuit, by which the superconducting qubit can be changed to the ground state (e.g., $|0\rangle$). In some embodiments, the feedback circuit can generate the NOT-gate signal within a short time (e.g., 200 ns) for fast initialization of the superconducting qubit without increasing hardware cost. The feedback circuit can be used to effectively ensure that the superconducting qubit is initialized to the ground state before each measurement. Using the feedback circuit for initializing only the excited state to the ground state can be faster than initializing all states to the ground state between each two measurements.

Still referring to FIG. 10, after initializing the superconducting qubit to be the ground state, the control circuit can perform second operation group 1002 after a time gap. Similar to first operation group 1006, the control circuit can acquire the superconducting qubit in the ground state and measure the superconducting qubit (e.g., at time T2 in FIG. 2B) for the second time after the superconducting qubit interacts with the environment for the time period, the process of which is represented by the block first measurement 1004 in FIG. 10. For example, the measured superconducting qubit after second measurement 1004 can be in the ground state (e.g., $|0\rangle$) or an excited state (e.g., $|1\rangle$), which can carry information of the environment.

Consistent with some embodiments of this disclosure, with reference to FIGS. 9-10 as examples, the control circuit can determine effective environmental information (e.g., represented as $|n\rangle$) in a post-selection mode based on the first environmental information $|n1\rangle$ and the second environmental information $|n2\rangle$. For example, after obtaining the first environmental information $|n1\rangle$, the control circuit can detect a first state (e.g., represented as $|\psi_1\rangle$) of the superconducting qubit with a first energy level (e.g., first energy level 214 in FIG. 2A). After obtaining the second environmental information $|n2\rangle$, the control circuit can detect a second state (e.g., represented as $|\psi_2\rangle$) of the superconducting qubit with a second energy level (e.g., second energy level 220 in FIG. 2A).

For example, to determine the effective environmental information $|n\rangle$, if the first state $|\psi_1\rangle$ of the superconducting qubit is the ground state (e.g., $|0\rangle$), it can be determined that the first environmental information $|n1\rangle$ is accurate and reliable, and the second environmental information $|n2\rangle$ is incorrect. The control circuit can then determine the first environmental information $|n1\rangle$ as the effective environmental information $|n\rangle$. In some embodiments, the control circuit can also save the second environmental information $|n2\rangle$.

In another example, to determine the effective environmental information $|n\rangle$, if the second state $|\psi_2\rangle$ of the superconducting qubit is the excited state (e.g., $|1\rangle$), it can be determined that the second environmental information $|n2\rangle$ is accurate and reliable, and the first environmental information $|n1\rangle$ is incorrect. The control circuit can then determine the second environmental information $|n2\rangle$ as the effective environmental information $|n\rangle$. In some embodiments, the control circuit can also save the first environmental information $|n1\rangle$.

Figure 11:
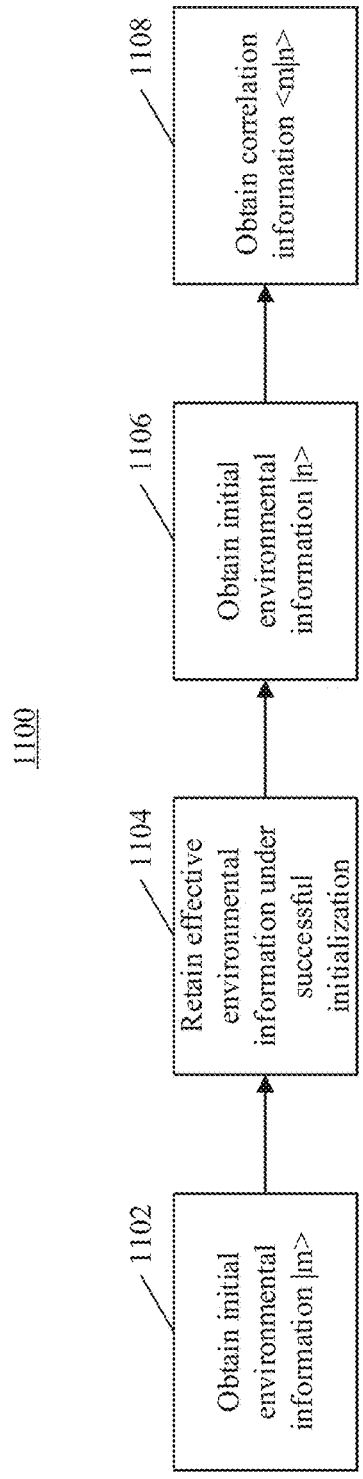
FIG. 11 is a flowchart of an example method of determining correlation information for an application, consistent with some embodiments of the present disclosure.

By way of example, FIG. 11 is a flowchart of an example method 1100 of determining correlation information for an application, consistent with some embodiments of the present disclosure. As depicted in FIG. 11, at step 1102, a control circuit (e.g., control circuit 102 in FIG. 1) of a measurement system (e.g., measurement system 100 in FIG. 1) can obtain initial environmental information $|m\rangle$ (e.g., by performing method 400 or as illustrated and described in association with FIG. 4 or FIG. 5, respectively).

At step 1104, the control circuit can retain the effective environmental information $|n\rangle$ under successful initialization in which the state of the superconducting qubit is reset to the ground state between measurements. For example, in method 900 of FIG. 9, if the first state $|\psi_1\rangle$ of the superconducting qubit is the ground state (e.g., $|0\rangle$), the control circuit can determine that the initialization is successful and retain the first environmental information $|n1\rangle$ as the effective environmental information $|n\rangle$. In another example, in method 1000 of FIG. 10, if the second state $|\psi_2\rangle$ of the superconducting qubit is the excited state (e.g., $|1\rangle$), because the control circuit applies the NOT-gate signal to the superconducting qubit to reset it to the ground state, the control circuit can determine that the initialization is successful and retain the second environmental information $|n2\rangle$ as the effective environmental information $|n\rangle$.

At step 1106, the control circuit can obtain the effective environmental information $|n\rangle$. At step 1108, the control circuit can analyze the effective environmental information $|n\rangle$ and the initial environmental information $|m\rangle$ to determine arbitrary-order correlation information (e.g., arbitrary-order correlation information 226 in FIG. 2A) for identifying an environmental noise. For example the arbitrary-order correlation information can be second-order correlation information (e.g., represented as $\langle m|n\rangle$). In this disclosure, the symbol "$\langle \ | \ \rangle$" is a representation of an inner product. It should be noted that other arbitrary-order correlation information can be determined in a manner similar to the determination of the second-order correlation information, as described herein, the details of which will not be repeated hereinafter.

As can be seen from FIGS. 9-11 and their associated description, through a post-selection mode, the control circuit can obtain acquire the effective environmental information with accuracy and reliability. Moreover, the accuracy and reliability of acquiring second-order correlation information can be effectively realized based on the effective environmental information and initial environmental information, thus facilitating subsequent analysis and identification of an environmental noise based on the second-order correlation information, and thereby improving the practicability of the technical solution.

Consistent with some embodiments of this disclosure, with reference to FIGS. 9-11 as examples, the control circuit can determine effective environmental information (e.g., represented as $|n\rangle$) a post-selection mode based on the first environmental information $|n1\rangle$ and the second environmental information $|n2\rangle$ and correct arbitrary-order correlation information in account of measurement error, such as error information (e.g., represented as "Pe") corresponding to the initialization of the state of the superconducting qubit.

For example, the superconducting qubit can have either of the following situations: (1) the superconducting qubit is in a ground state before first measurement (e.g., first measurement 902 in FIG. 9 or first measurement 1002 in FIG. 10) and in an excited state after the first measurement; (2) the superconducting qubit is in the excited state before the first measurement and in the ground state after the first measurement. Because of such situations, an error (or "initialization error information") can occur in second measurement (e.g., second measurement 904 in FIG. 9 or second measurement 1004 in FIG. 10) performed on the superconducting qubit after the first measurement. It should be noted that the error information can affect the accuracy of the second measurement result. To mitigate such accuracy loss, the error information corresponding to the effective environmental information can be acquired for the second measurement.

Figure 12:
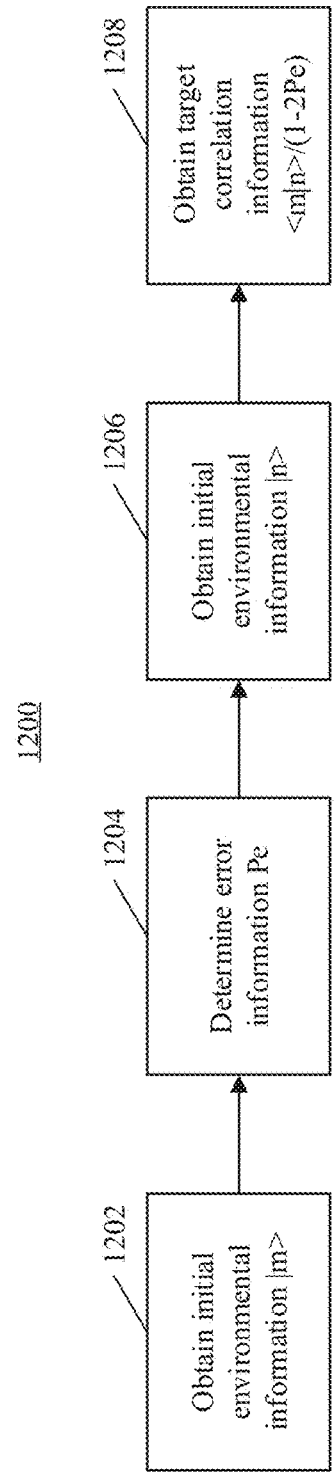
FIG. 12 is a flowchart of another example method of determining correlation information for an application, consistent with some embodiments of the present disclosure.

By way of example, FIG. 12 is a flowchart of an example method 1200 of determining correlation information for an application, consistent with some embodiments of the present disclosure. Method 1200 includes steps 1202-1208. Step 1202 can be the same or similar to Step 1102.

At step 1204, the control circuit can acquire the error information Pe. In some embodiments, assuming the superconducting qubit is in the ground state before the first measurement and in the excited state after the first measurement, the control circuit can continuously measure the superconducting qubit in the ground state for multiple times to obtain first probability of it being in the ground state and second probability of it being in the excited state. The control circuit can also continuously measure the superconducting qubit in the excited state for multiple times to obtain third probability of it being in the ground state and fourth probability of it being in the excited state. The control circuit can then determine the error information Pe using a machine learning model. For example, the machine learning model can be trained based on training data that maps measurement counts to probabilities of the measured superconducting qubit being in states, such as mapping the first probability, the second probability, the third probability, and the fourth probability to corresponding first measurement counts, second measurement counts, third measurement counts, and fourth measurement counts, respectively.

At step 1206, the control circuit can obtain the effective environmental information $|n\rangle$. For example, if the first state $|\psi_1\rangle$ of the superconducting qubit is the ground state (e.g., $|0\rangle$) in method 900 of FIG. 9, the control circuit can determine the first environmental information $|n1\rangle$ as the effective environmental information $|n\rangle$. In another example, if the second state $|\psi_2\rangle$ of the superconducting qubit is the excited state (e.g., $|1\rangle$) in method 1000 of FIG. 10, the control circuit can determine the second environmental information $|n2\rangle$ as the effective environmental information $|n\rangle$.

At step 1208, the control circuit can determine a correction factor as (1-2Pe) corresponding to the arbitrary-order correlation information based on the error information, and determine target correlation information as a ratio of $\langle m|n\rangle /(1-2Pe)$. It should be noted that when the arbitrary-order correlation information is multi-order correlation information other than second-order correlation information $\langle m|n\rangle$, the multi-order correlation information can be represented as $\Sigma_m \langle m|n\rangle$. Correspondingly, the control circuit can determine the target correlation information as a ratio of $\Sigma_m \langle m|n\rangle /(1-2Pe)$.

As n seen from FIG. 12 and its associated description, the second measurement result of the superconducting qubit can be determined through a post-selection mode, and some measurement errors that exist during the data processing can be considered. By doing to, the accuracy and reliability of the measurement of the correlation information of an environmental noise can be effectively ensured, thereby effectively improving the practicability of the technical solution.

Figure 13:
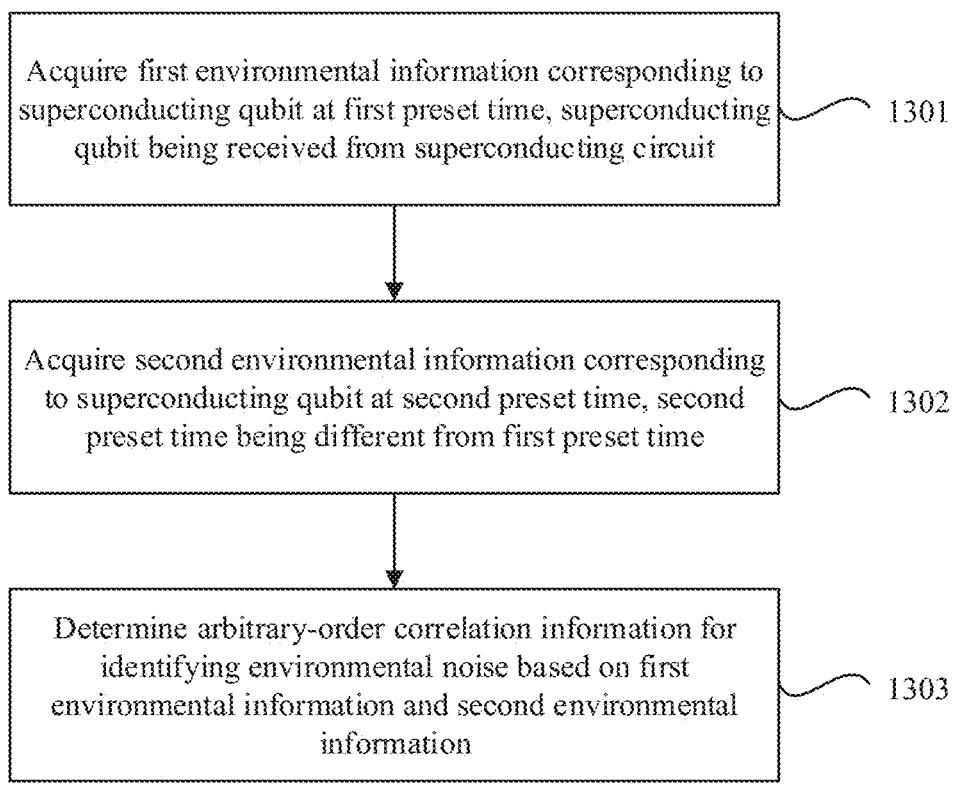
FIG. 13 is a flowchart of yet another example measurement method, consistent with some embodiments of the present disclosure.

By way of example, FIG. 13 is a flowchart of an example measurement method 1300, consistent with some embodiments of the present disclosure. At step 1301, a control circuit (e.g., control circuit 102 in FIG. 1) of a measurement system (e.g., measurement system 100 in FIG. 1) can acquire first environmental information (e.g., the first environmental information in FIG. 9) corresponding to a superconducting qubit (e.g., superconducting qubit 204 in FIG. 2A) at a first preset time. The control circuit can receive the superconducting qubit from a superconducting circuit (e.g., superconducting circuit 101 in FIG. 2A).

At step 1302, the control circuit can acquire second environmental information (e.g., the second environmental information in FIG. 10) corresponding to the superconducting qubit at a second preset time. The second preset time is different from the first preset time. In some embodiments, to acquire the second environmental information, the control circuit can determine first information (e.g., a microwave signal) corresponding to the superconducting qubit in response to a quantum energy level of the superconducting qubit being a first preset energy level (e.g., a ground state). The control circuit can then determine second information (e.g., a microwave feedback signal) corresponding to the superconducting qubit in response to the quantum energy level of the superconducting qubit being a second preset energy level (e.g., an excited state). Then, the control circuit can determine the second environmental information based on the first information and the second information.

At step 1303, the control circuit can determine arbitrary-order correlation information (e.g., the correlation information illustrated in FIGS. 11-12) for identifying an environmental noise based on the first environmental information and the second environmental information.

In some examples, the arbitrary-order correlation information includes second-order correlation information. Determining arbitrary-order correlation information for identifying an environmental noise according to the first environmental information and the second environmental information includes: determining an inner product of the first environmental information and the second environmental information as second-order correlation information for identifying an environmental noise.

Figure 14:
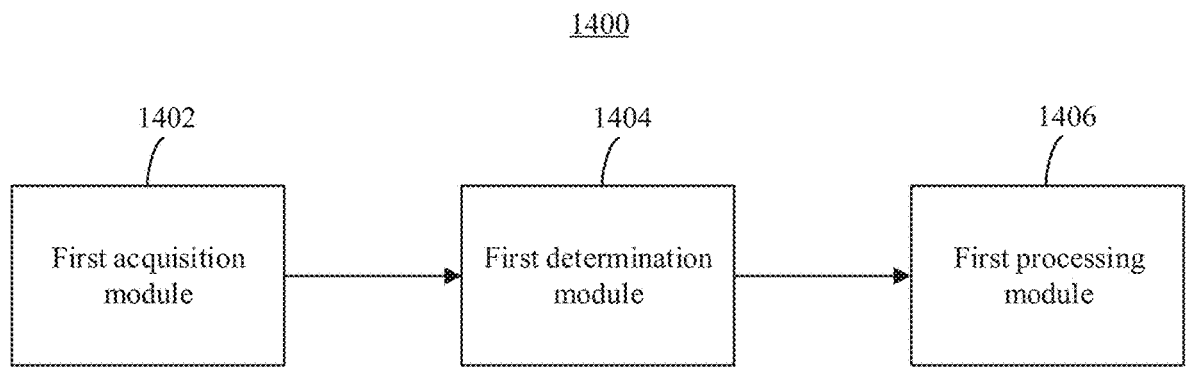
FIG. 14 is a schematic diagram of an example measurement apparatus, consistent with some embodiments of the present disclosure.

FIG. 14 is a schematic diagram of an example measurement apparatus 1400, consistent with some embodiments of the present disclosure. Apparatus 1400 can be used for performing methods or operations as described in association with FIGS. 1-12. In some embodiments, apparatus 1400 can be included in a control circuit (e.g., control circuit 102 in FIG. 1) of a measurement system (e.g., measurement system 100 in FIG. 1). In some embodiments, apparatus 1400 can be included in a data processing circuit. As shown in FIG. 14, apparatus 1400 includes a first acquisition module 1402, a first determination module 1404, and a first processing module 1406, which can be implemented as a computer program product (e.g., embodied in a computer-readable medium) that includes computer-executable instructions (e.g., program codes) to be executed by a computer (e.g., apparatus 200C in FIG. 2C) or a hardware product (e.g., measurement executor 264 in FIG. 2C) that stores computer-executable instructions (e.g., program codes) and can be a standalone or integrated part of any of apparatus 200C.

Referring to FIG. 14, first acquisition module 1402 can perform step 301 in FIG. 3, steps 401-403 in FIG. 4, steps 501-503 in FIG. 5, and step 801 of FIG. 8. First determination module 1404 can perform steps 302-303 in FIG. 3. First determination module 1404 can perform steps 304-305 in FIG. 3, steps 601-603 of FIG. 6, steps 701-702 in FIG. 7, and step 802 in FIG. 8. For parts that are not described in detail in FIG. 14, reference can be made to the related descriptions of FIGS. 1-12 and will not be repeated in detail hereinafter.

Figure 15:
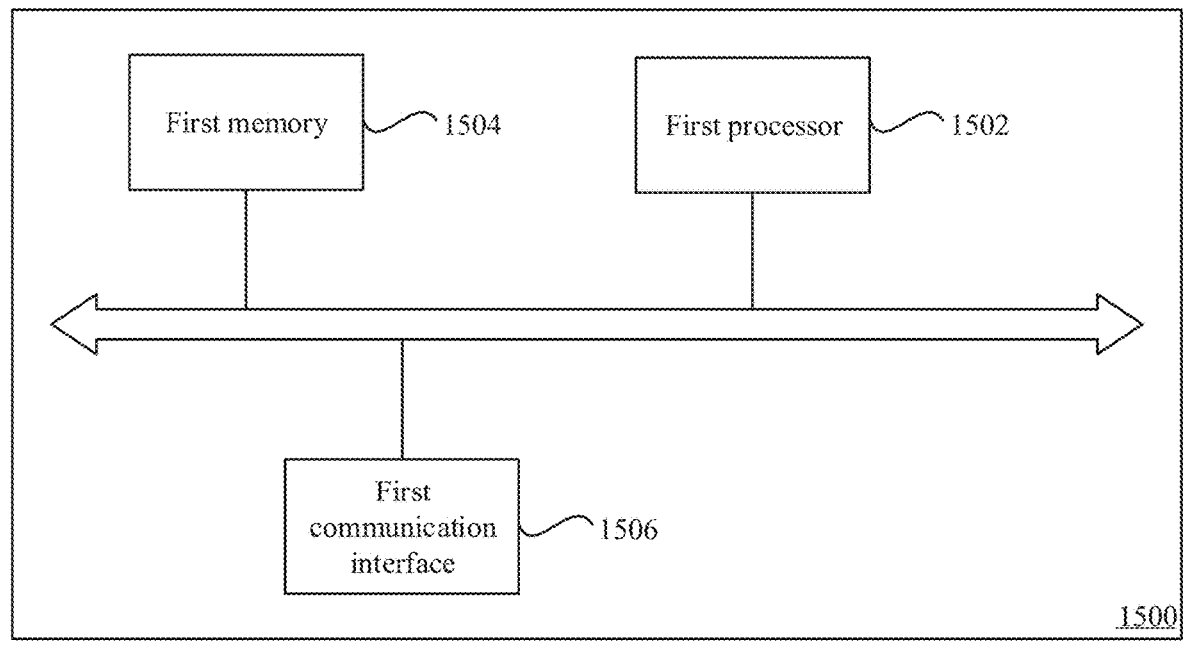
FIG. 15 is a schematic diagram of an example electronic device corresponding to a measurement apparatus, consistent with some embodiments of the present disclosure.

Consistent with some embodiments of this disclosure, apparatus 1400 can be implemented as an electronic device (e.g., a computer, a mobile phone, a tablet computer, or a server). FIG. 15 is a schematic diagram of an example electronic device 1500 corresponding to a measurement apparatus, consistent with some embodiments of the present disclosure. Electronic device 1500 includes a first processor 1502 (e.g., implemented as processor 252 in FIG. 2C), a first memory 1504 (e.g., implemented as processor 254 in FIG. 2C) communicatively coupled to first processor 1502, and a first communication interface 1506 (e.g., implemented as NIC 260 or I/O 258 in FIG. 2C) communicatively coupled to first processor 1502 and first memory 1504. First communication interface 1506 can communicate data with other devices or a communication network.

Electronic device 1500 can be used for performing methods or operations as described in association with FIGS. 1-12. For example, first memory 1504 can store a program corresponding to the electronic device to perform the method and operations as described in association with FIGS. 1-12. First processor 1502 can execute the program stored in first memory 1504.

In some embodiments, apparatus 1400 can be implemented as part of electronic device 1500, such as a software product or a hardware product thereof. For example, apparatus 1400 can be implemented as part of first processor 1502, first memory 1504, first communication interface 1506, or a combination thereof.

Figure 16:
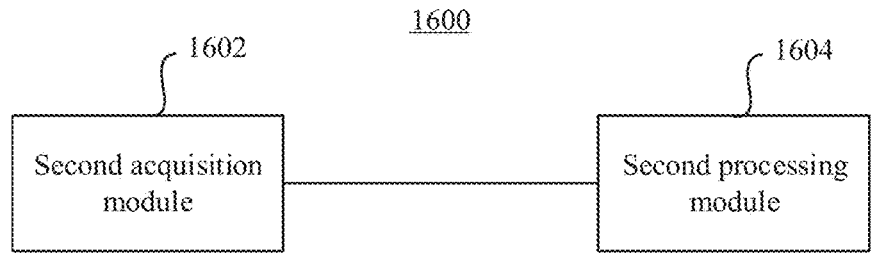
FIG. 16 is a schematic diagram of another measurement apparatus, consistent with some embodiments of the present disclosure.

FIG. 16 is a schematic diagram of another measurement apparatus 1600, consistent with some embodiments of the present disclosure. Apparatus 1600 can be used for performing methods or operations as described in association with FIG. 13. In some embodiments, apparatus 1600 can be included in a control circuit (e.g., control circuit 102 in FIG. 1) of a measurement system (e.g., measurement system 100 in FIG. 1). In some embodiments, apparatus 1600 can be included in a data processing circuit. As shown in FIG. 16, apparatus 1600 includes a second acquisition module 1602 and a second processing module 1604, which can be implemented as a computer program product (e.g., embodied in a computer-readable medium) that includes computer-executable instructions (e.g., program codes) to be executed by a computer (e.g., apparatus 200C in FIG. 2C) or a hardware product (e.g., measurement executor 264 in FIG. 2C) that stores computer-executable instructions (e.g., program codes) and can be a standalone or integrated part of any of apparatus 200C.

Referring to FIG. 16, second acquisition module 1602 can perform steps 1301-1302 in FIG. 3. Second processing module 1604 can perform step 1303 in FIG. 13. For parts that are not described in detail in FIG. 16, reference can be made to the related descriptions of FIG. 13 and will not be repeated in detail hereinafter.

Figure 17:
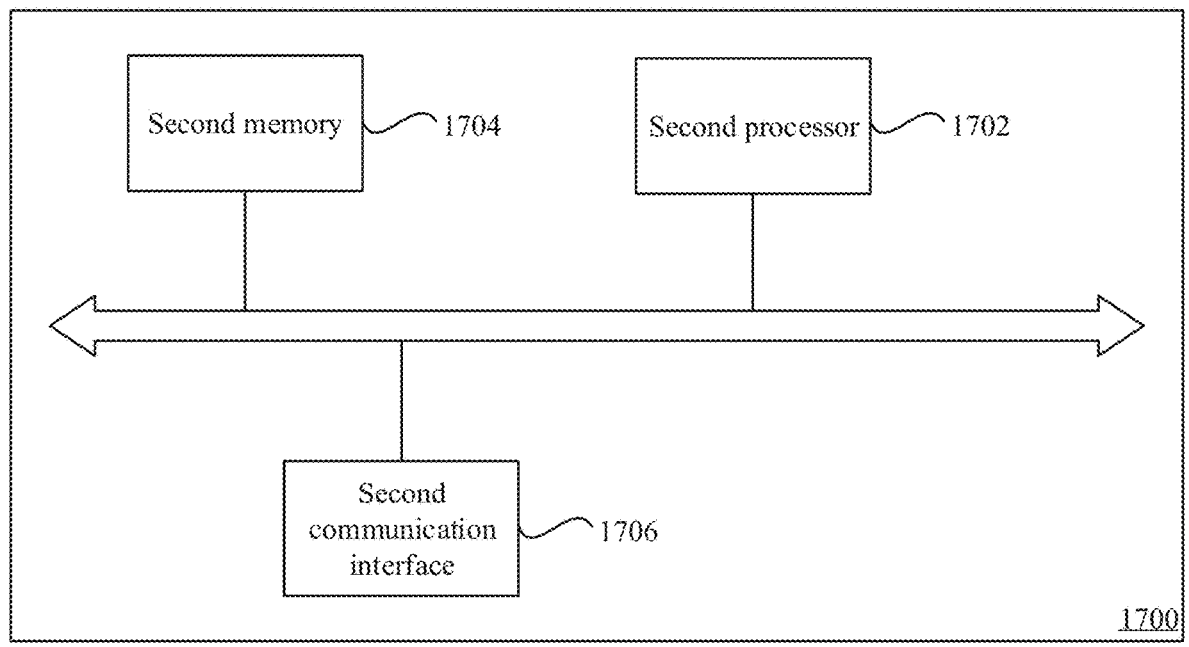
FIG. 17 is a schematic diagram of another example electronic device corresponding to a measurement apparatus, consistent with some embodiments of the present disclosure.

Consistent with some embodiments of this disclosure, apparatus 1600 can be implemented as an electronic device (e.g., a computer, a mobile phone, a tablet computer, or a server). FIG. 17 is a schematic diagram of another example electronic device 1700 corresponding to a measurement apparatus, consistent with some embodiments of the present disclosure. Electronic device 1700 includes a second processor 1702 (e.g., implemented as processor 252 in FIG. 2C), a second memory 1704 (e.g., implemented as processor 254 in FIG. 2C) communicatively coupled to second processor 1702, and a second communication interface 1706 (e.g., implemented as NIC 260 or I/O 258 in FIG. 2C) communicatively coupled to second processor 1702 and second memory 1704. Second communication interface 1706 can communicate data with other devices or a communication network.

Electronic device 1700 can be used for performing methods or operations as described in association with FIG. 13. For example, second memory 1704 can store a program corresponding to the electronic device to perform the method and operations as described in association with FIG. 13. Second processor 1702 can execute the program stored in second memory 1704.

In some embodiments, apparatus 1600 can be implemented as part of electronic device 1700, such as a software product or a hardware product thereof. For example, apparatus 1600 can be implemented as part of second processor 1702, second memory 1704, second communication interface 1706, or a combination thereof.

In some embodiments, a non-transitory computer-readable storage medium including instructions is also provided, and the instructions can be executed by a device (such as the apparatuses and electronic devices disclosed herein), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

The embodiments can further be described using the following clauses:
1. A non-transitory computer-readable medium storing a set of instructions executable by at least one processor of an apparatus to cause the apparatus to perform a method, the method comprising:
  acquiring initial environmental information corresponding to a superconducting qubit received from a superconducting circuit, the superconducting circuit being in an environment;
  determining first environmental information corresponding to the superconducting qubit in response to a quantum energy level of the superconducting qubit being a first preset energy level;
  determining second environmental information corresponding to the superconducting qubit in response to the quantum energy level of the superconducting qubit being a second preset energy level;

determining effective environmental information based on the first environmental information and the second environmental information; and determining arbitrary-order correlation information for identifying an environmental noise based on the effective environmental information and the initial environmental information.

2. The non-transitory computer-readable medium of clause 1, wherein the quantum energy level of the superconducting qubit comprises at least one of a ground state or an excited state.

3. The non-transitory computer-readable medium of clause 1, wherein the initial environmental information comprises at least one of information about an initial magnetic flux in the environment, information about an initial electric field in the environment, or fluctuation information about an initial quantum noise in the environment;

the first environmental information comprises at least one of information about a first magnetic flux in the environment, information about a first electric field in the environment, or fluctuation information about a first quantum noise in the environment; and the second environmental information comprises at least one of information about a second magnetic flux in the environment, information about a second electric field in the environment, or fluctuation information about a second quantum noise in the environment.

4. The non-transitory computer-readable medium of clause 1, wherein acquiring the initial environmental information corresponding to the superconducting qubit comprises:

acquiring the initial environmental information corresponding to the superconducting qubit after the superconducting qubit interacts with the environment for a time period.

5. The non-transitory computer-readable medium of clause 4, wherein acquiring the initial environmental information corresponding to the superconducting qubit after the superconducting qubit interacts with the environment for the time period comprises:

controlling the superconducting qubit to be in a preset superposition state, determining a post-interaction qubit corresponding to the superconducting qubit after the superconducting qubit interacts with the environment for the time period; and acquiring the initial environmental information corresponding to the post-interaction qubit.

6. The non-transitory computer-readable medium of clause 5, wherein the preset superposition state comprises a quantum state in combination of a ground state and an excited state.

7. The non-transitory computer-readable medium of clause 5, wherein the set of instructions executable by at least one processor of the apparatus to cause the apparatus to further perform:

before controlling the superconducting qubit to be in the preset superposition state, initializing the superconducting circuit to generate the superconducting qubit being in a ground state or an excited state.

8. The non-transitory computer-readable medium of clause 5, wherein acquiring the initial environmental information corresponding to the post-interaction qubit comprises:

sending a microwave signal to the superconducting circuit;

acquiring a microwave feedback signal from the superconducting circuit; and determining the initial environmental information corresponding to the post-interaction qubit based on the microwave signal and the microwave feedback signal.

9. The non-transitory computer-readable medium of any of clauses 1-8, wherein the first preset energy level comprises a ground state or an excited state.

10. The non-transitory computer-readable medium of clause 9, wherein the second preset energy level comprises the excited state or the ground state, and the second preset energy level is different from the first preset energy level.

11. The non-transitory computer-readable medium of clause 10, further comprising:

acquiring a feedback signal, wherein the feedback signal corresponds to the first preset energy level in response to the quantum energy level of the superconducting qubit not being the first preset energy level or corresponds to the second preset energy level in response to the quantum energy level of the superconducting qubit not being the second preset energy level; and adjusting the superconducting circuit based on the feedback signal, wherein the quantum energy level of the superconducting qubit is at the first preset energy level or the second preset energy level.

12. The non-transitory computer-readable medium of clause 11, wherein the feedback signal comprises a NOT-gate signal for adjusting the superconducting qubit.

13. The non-transitory computer-readable medium of clause 10, wherein determining effective environmental information based on the first environmental information and the second environmental information comprises:

acquiring a first energy level of the superconducting qubit corresponding to the first environmental information and a second energy level of the superconducting qubit corresponding to the second environmental information; and determining the effective environmental information as the first environmental information in response to the first energy level being the same as the first preset energy level, or as the second environmental information in response to the second energy level being the same as the second preset energy level.

14. The non-transitory computer-readable medium of any of clauses 1-8, wherein the set of instructions executable by at least one processor of the apparatus to cause the apparatus to further perform:

acquiring error information corresponding to the effective environmental information; and processing the arbitrary-order correlation information based on the error information to determine target correlation information for identifying the environmental noise.

15. The non-transitory computer-readable medium of clause 14, wherein processing the arbitrary-order correlation information based on the error information to determine the target correlation information for identifying the environmental noise comprises:

determining, based on the error information, a correction factor corresponding to the arbitrary-order correlation information; and determining a ratio of the arbitrary-order correlation information to the correction factor as the target correlation information.

16. The non-transitory computer-readable medium of clause 15, wherein determining, based on the error information, the correction factor corresponding to the arbitrary-order correlation information comprises:
acquiring a product of the error information and a preset coefficient; and
determining a difference between 1 and the product as the correction factor corresponding to the arbitrary-order correlation information.
17. The non-transitory computer-readable medium of any of clauses 1-8, wherein the arbitrary-order correlation information comprises second-order correlation information.
18. The non-transitory computer-readable medium of clause 17, wherein determining the arbitrary-order correlation information for identifying the environmental noise based on the effective environmental information and the initial environmental information comprises:
determining an inner product of the effective environmental information and the initial environmental information as the second-order correlation information.
19. The non-transitory computer-readable medium of clause 18, wherein the set of instructions executable by at least one processor of the apparatus to cause the apparatus to further perform:
identifying a noise spectral density of the superconducting qubit using the second-order correlation information.
20. A system for measurement, comprising:
a superconducting circuit being in an environment and configured to generate a superconducting qubit; and
a control circuit electrically connected to the superconducting circuit and configured to perform:
acquiring initial environmental information corresponding to the superconducting qubit;
determining first environmental information corresponding to the superconducting qubit in response to a quantum energy level of the superconducting qubit being a first preset energy level;
determining second environmental information corresponding to the superconducting qubit in response to the quantum energy level of the superconducting qubit being a second preset energy level;
determining effective environmental information based on the first environmental information and the second environmental information; and
determining arbitrary-order correlation information for identifying an environmental noise based on the effective environmental information and the initial environmental information.
21. The system of clause 20, wherein the quantum energy level of the superconducting qubit comprises at least one of a ground state or an excited state.
22. The system of clause 20, wherein the initial environmental information comprises at least one of information about an initial magnetic flux in the environment, information about an initial electric field in the environment, or fluctuation information about an initial quantum noise in the environment;
the first environmental information comprises at least one of information about a first magnetic flux in the environment, information about a first electric field in the environment, or fluctuation information about a first quantum noise in the environment; and
the second environmental information comprises at least one of information about a second magnetic flux in the environment, information about a second electric field in the environment, or fluctuation information about a second quantum noise in the environment.
23. The system of clause 20, wherein acquiring the initial environmental information corresponding to the superconducting qubit comprises:
acquiring the initial environmental information corresponding to the superconducting qubit after the superconducting qubit interacts with the environment for a time period.
24. The system of clause 23, wherein acquiring the initial environmental information corresponding to the superconducting qubit after the superconducting qubit interacts with the environment for the time period comprises:
controlling the superconducting qubit to be in a preset superposition state;
determining a post-interaction qubit corresponding to the superconducting qubit after the superconducting qubit interacts with the environment for the time period; and
acquiring the initial environmental information corresponding to the post-interaction qubit.
25. The system of clause 24, wherein the preset superposition state comprises a quantum state in combination of a ground state and an excited state.
26. The system of clause 24, wherein before controlling the superconducting qubit to be in the preset superposition state, the control circuit is further configured to perform:
initializing the superconducting circuit to generate the superconducting qubit being in a ground state or an excited state.
27. The system of clause 24, wherein acquiring the initial environmental information corresponding to the post-interaction qubit comprises:
sending a microwave signal to the superconducting circuit;
acquiring a microwave feedback signal from the superconducting circuit; and
determining the initial environmental information corresponding to the post-interaction qubit based on the microwave signal and the microwave feedback signal.
28. The system of any of clauses 20-27, wherein the first preset energy level comprises a ground state or an excited state.
29. The system of clause 28, wherein the second preset energy level comprises the excited state or the ground state, and the second preset energy level is different from the first preset energy level.
30. The system of clause 29, further comprising:
a feedback circuit electrically connected to the control circuit and configured to perform one of:
generating a feedback signal corresponding to the first preset energy level in response to the quantum energy level of the superconducting qubit not being the first preset energy level; or
generating a feedback signal corresponding to the second preset energy level in response to the quantum energy level of the superconducting qubit not being the second preset energy level, wherein
the control circuit is further configured to perform:
adjusting the superconducting circuit based on the feedback signal, wherein the quantum energy level of the superconducting qubit is at the first preset energy level or the second preset energy level.
31. The system of clause 30, wherein the feedback signal comprises a NOT-gate signal for adjusting the superconducting qubit.

32. The system of clause 29, wherein determining effective environmental information based on the first environmental information and the second environmental information comprises:
acquiring a first energy level of the superconducting qubit corresponding to the first environmental information and a second energy level of the superconducting qubit corresponding to the second environmental information; and
determining the effective environmental information as the first environmental information in response to the first energy level being the same as the first preset energy level, or as the second environmental information in response to the second energy level being the same as the second preset energy level.

33. The system of any of clauses 20-27, wherein the control circuit is further configured to perform:
acquiring error information corresponding to the effective environmental information; and
processing the arbitrary-order correlation information based on the error information to determine target correlation information for identifying the environmental noise.

34. The system of clause 33, wherein processing the arbitrary-order correlation information based on the error information to determine the target correlation information for identifying the environmental noise comprises:
determining, based on the error information, a correction factor corresponding to the arbitrary-order correlation information; and
determining a ratio of the arbitrary-order correlation information to the correction factor as the target correlation information.

35. The system of clause 34, wherein determining, based on the error information, the correction factor corresponding to the arbitrary-order correlation information comprises:
acquiring a product of the error information and a preset coefficient; and
determining a difference between 1 and the product as the correction factor corresponding to the arbitrary-order correlation information.

36. The system of any of clauses 20-27, further comprising a refrigerator electrically connected to the control circuit and configured to perform:
causing the superconducting circuit to be in the environment under control of the control circuit.

37. The system of any of clauses 20-27, wherein the arbitrary-order correlation information comprises second-order correlation information, and determining the arbitrary-order correlation information for identifying the environmental noise based on the effective environmental information and the initial environmental information comprises:
determining an inner product of the effective environmental information and the initial environmental information as the second-order correlation information.

38. The system of clause 37, wherein the control circuit is further configured to perform:
identifying a noise spectral density of the superconducting qubit using the second-order correlation information.

39. A method for measurement, comprising.
acquiring initial environmental information corresponding to a superconducting qubit received from a superconducting circuit, the superconducting circuit being in an environment;
determining first environmental information corresponding to the superconducting qubit in response to a quantum energy level of the superconducting qubit being a first preset energy level;
determining second environmental information corresponding to the superconducting qubit in response to the quantum energy level of the superconducting qubit being a second preset energy level;
determining effective environmental information based on the first environmental information and the second environmental information; and
determining arbitrary-order correlation information for identifying an environmental noise based on the effective environmental information and the initial environmental information.

40. The method of clause 39, wherein the quantum energy level of the superconducting qubit comprises at least one of a ground state or an excited state.

41. The method of clause 39, wherein the initial environmental information comprises at least one of information about an initial magnetic flux in the environment, information about an initial electric field in the environment, or fluctuation information about an initial quantum noise in the environment;
the first environmental information comprises at least one of information about a first magnetic flux in the environment, information about a first electric field in the environment, or fluctuation information about a first quantum noise in the environment; and
the second environmental information comprises at least one of information about a second magnetic flux in the environment, information about a second electric field in the environment, or fluctuation information about a second quantum noise in the environment.

42. The method of clause 39, wherein acquiring the initial environmental information corresponding to the superconducting qubit comprises:
acquiring the initial environmental information corresponding to the superconducting qubit after the superconducting qubit interacts with the environment for a time period.

43. The method of clause 42, wherein acquiring the initial environmental information corresponding to the superconducting qubit after the superconducting qubit interacts with the environment for the time period comprises:
controlling the superconducting qubit to be in a preset superposition state;
determining a post-interaction qubit corresponding to the superconducting qubit after the superconducting qubit interacts with the environment for the time period; and
acquiring the initial environmental information corresponding to the post-interaction qubit.

44. The method of clause 43, wherein the preset superposition state comprises a quantum state in combination of a ground state and an excited state.

45. The method of clause 43, further comprising:
before controlling the superconducting qubit to be in the preset superposition state, initializing the superconducting circuit to generate the superconducting qubit being in a ground state or an excited state.

46. The method of clause 43, wherein acquiring the initial environmental information corresponding to the post-interaction qubit comprises:
sending a microwave signal to the superconducting circuit;

acquiring a microwave feedback signal from the superconducting circuit; and determining the initial environmental information corresponding to the post-interaction qubit based on the microwave signal and the microwave feedback signal.

47. The method of any of clauses 39-46, wherein the first preset energy level comprises a ground state or an excited state.

48. The method of clause 47, wherein the second preset energy level comprises the excited state or the ground state, and the second preset energy level is different from the first preset energy level.

49. The method of clause 48, further comprising:

acquiring a feedback signal, wherein the feedback signal corresponds to the first preset energy level in response to the quantum energy level of the superconducting qubit not being the first preset energy level or corresponds to the second preset energy level in response to the quantum energy level of the superconducting qubit not being the second preset energy level; and adjusting the superconducting circuit based on the feedback signal, wherein the quantum energy level of the superconducting qubit is at the first preset energy level or the second preset energy level.

50. The method of clause 49, wherein the feedback signal comprises a NOT-gate signal for adjusting the superconducting qubit.

51. The method of clause 48, wherein determining effective environmental information based on the first environmental information and the second environmental information comprises:

acquiring a first energy level of the superconducting qubit corresponding to the first environmental information and a second energy level of the superconducting qubit corresponding to the second environmental information; and determining the effective environmental information as the first environmental information in response to the first energy level being the same as the first preset energy level, or as the second environmental information in response to the second energy level being the same as the second preset energy level.

52. The method of any of clauses 39-46, further comprising.

acquiring error information corresponding to the effective environmental information; and processing the arbitrary-order correlation information based on the error information to determine target correlation information for identifying the environmental noise.

53. The method of clause 52, wherein processing the arbitrary-order correlation information based on the error information to determine the target correlation information for identifying the environmental noise comprises:

determining, based on the error information, a correction factor corresponding to the arbitrary-order correlation information; and determining a ratio of the arbitrary-order correlation information to the correction factor as the target correlation information.

54. The method of clause 53, wherein determining, based on the error information, the correction factor corresponding to the arbitrary-order correlation information comprises:

acquiring a product of the error information and a preset coefficient; and determining a difference between 1 and the product as the correction factor corresponding to the arbitrary-order correlation information.

55. The method of any of clauses 39-46, wherein the arbitrary-order correlation information comprises second-order correlation information.

56. The method of clause 55, wherein determining the arbitrary-order correlation information for identifying the environmental noise based on the effective environmental information and the initial environmental information comprises:

determining an inner product of the effective environmental information and the initial environmental information as the second-order correlation information.

57. The method of clause 56, further comprising:

identifying a noise spectral density of the superconducting qubit using the second-order correlation information.

58. A non-transitory computer-readable medium storing a set of instructions executable by at least one processor of an apparatus to cause the apparatus to perform a method, the method comprising.

acquiring first environmental information corresponding to a superconducting qubit at a first preset time, the superconducting qubit being received from a superconducting circuit;

acquiring second environmental information corresponding to the superconducting qubit at a second preset time, the second preset time being different from the first preset time; and determining arbitrary-order correlation information for identifying an environmental noise based on the first environmental information and the second environmental information.

59. The non-transitory computer-readable medium of clause 60, wherein acquiring the second environmental information corresponding to the superconducting qubit at the second preset time comprises:

determining first information corresponding to the superconducting qubit in response to a quantum energy level of the superconducting qubit being a first preset energy level;

determining second information corresponding to the superconducting qubit in response to the quantum energy level of the superconducting qubit being a second preset energy level; and determining the second environmental information based on the first information and the second information.

60. A method for measurement, comprising:

acquiring first environmental information corresponding to a superconducting qubit at a first preset time, the superconducting qubit being received from a superconducting circuit;

acquiring second environmental information corresponding to the superconducting qubit at a second preset time, the second preset time being different from the first preset time; and determining arbitrary-order correlation information for identifying an environmental noise based on the first environmental information and the second environmental information.

61. The method of clause 60, wherein acquiring the second environmental information corresponding to the superconducting qubit at the second preset time comprises:

determining first information corresponding to the superconducting qubit in response to a quantum energy level of the superconducting qubit being a first preset energy level;

determining second information corresponding to the superconducting qubit in response to the quantum energy level of the superconducting qubit being a second preset energy level; and determining the second environmental information based on the first information and the second information.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. As used herein, the indefinite articles "a" and "an" mean "one or more." The term "multiple" in this disclosure generally includes at least two, but does not exclude the inclusion of at least one. Similarly, the use of a plural term does not necessarily denote a plurality unless it is unambiguous in the given context.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

Depending on the context, the word "if" as used herein can be interpreted as "at the time of" or "when" or "in response to" or "based on a determination that (a stated condition or event)."

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module/unit, and each of the above described modules/units can be further divided into a plurality of sub-modules/sub-units.

The apparatus embodiment described above is only schematic, where the units described as separate components can or cannot be physically separated, and the components displayed as units can or cannot be physical units, that is, can be located in one place, or can be distributed to a plurality of network units. Part or all of the modules can also be selected according to actual needs to achieve the purpose of the solution of the present embodiment. Those of ordinary skill in the art can understand and implement the above without creative efforts.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as example only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A non-transitory computer-readable medium storing a set of instructions executable by at least one processor of an apparatus to cause the apparatus to perform a method, the method comprising: acquiring initial environmental information corresponding to a superconducting qubit received from a superconducting circuit, the superconducting circuit being in an environment; determining first environmental information corresponding to the superconducting qubit in response to a quantum energy level of the superconducting qubit being a first preset energy level; determining second environmental information corresponding to the superconducting qubit in response to the quantum energy level of the superconducting qubit being a second preset energy level; determining effective environmental information based on the first environmental information and the second environmental information; and determining arbitrary-order correlation information for identifying an environmental noise based on the effective environmental information and the initial environmental information, wherein the initial environmental information comprises at least one of information about an initial magnetic flux in the environment, information about an initial electric field in the environment, or fluctuation information about an initial quantum noise in the environment; the first environmental information comprises at least one of information about a first magnetic flux in the environment, information about a first electric field in the environment, or fluctuation information about a first quantum noise in the environment; and the second environmental information comprises at least one of information about a second magnetic flux in the environment, information about a second electric field in the environment, or fluctuation information about a second quantum noise in the environment.

2. The non-transitory computer-readable medium of claim 1, wherein the quantum energy level of the superconducting qubit comprises at least one of a ground state or an excited state.

3. A non-transitory computer-readable medium storing a set of instructions executable by at least one processor of an apparatus to cause the apparatus to perform a method, the method comprising: acquiring initial environmental information corresponding to a superconducting qubit received from a superconducting circuit after the superconducting qubit interacts with an environment for a time period; determining first environmental information corresponding to the superconducting qubit in response to a quantum energy level of the superconducting qubit being a first Preset energy level; determining second environmental information corresponding to the superconducting qubit in response to the quantum energy level of the superconducting qubit being a second preset energy level; determining effective environmental information based on the first environmental information and the second environmental information; and determining arbitrary-order correlation information for identifying an environmental noise based on the effective environmental information and the initial environmental information.

4. The non-transitory computer-readable medium of claim 3, wherein acquiring the initial environmental information corresponding to the superconducting qubit after the superconducting qubit interacts with the environment for the time period comprises:
controlling the superconducting qubit to be in a preset superposition state;
determining a post-interaction qubit corresponding to the superconducting qubit after the superconducting qubit interacts with the environment for the time period; and
acquiring the initial environmental information corresponding to the post-interaction qubit.

5. The non-transitory computer-readable medium of claim 4, wherein the preset superposition state comprises a quantum state in combination of a ground state and an excited state.

6. The non-transitory computer-readable medium of claim 4, wherein the set of instructions executable by at least one processor of the apparatus to cause the apparatus to further perform:
before controlling the superconducting qubit to be in the preset superposition state, initializing the superconducting circuit to generate the superconducting qubit being in a ground state or an excited state.

7. The non-transitory computer-readable medium of claim 4, wherein acquiring the initial environmental information corresponding to the post-interaction qubit comprises:
sending a microwave signal to the superconducting circuit;
acquiring a microwave feedback signal from the superconducting circuit; and
determining the initial environmental information corresponding to the post-interaction qubit based on the microwave signal and the microwave feedback signal.

8. The non-transitory computer-readable medium of claim 1, wherein the first preset energy level comprises a ground state or an excited state.

9. The non-transitory computer-readable medium of claim 8, wherein the second preset energy level comprises the excited state or the ground state, and the second preset energy level is different from the first preset energy level.

10. The non-transitory computer-readable medium of claim 9, wherein the set of instructions executable by at least one processor of the apparatus to cause the apparatus to further perform:
acquiring a feedback signal, wherein the feedback signal corresponds to the first preset energy level in response to the quantum energy level of the superconducting qubit not being the first preset energy level or corresponds to the second preset energy level in response to the quantum energy level of the superconducting qubit not being the second preset energy level; and
adjusting the superconducting circuit based on the feedback signal, wherein the quantum energy level of the superconducting qubit is at the first preset energy level or the second preset energy level.

11. The non-transitory computer-readable medium of claim 10, wherein the feedback signal comprises a NOT-gate signal for adjusting the superconducting qubit.

12. The non-transitory computer-readable medium of claim 5, wherein determining effective environmental information based on the first environmental information and the second environmental information comprises:
acquiring a first energy level of the superconducting qubit corresponding to the first environmental information and a second energy level of the superconducting qubit corresponding to the second environmental information; and
determining the effective environmental information as the first environmental information in response to the first energy level being the same as the first preset energy level, or as the second environmental information in response to the second energy level being the same as the second preset energy level.

13. The non-transitory computer-readable medium of claim 1, wherein the set of instructions executable by at least one processor of the apparatus to cause the apparatus to further perform:
acquiring error information corresponding to the effective environmental information; and
processing the arbitrary-order correlation information based on the error information to determine target correlation information for identifying the environmental noise.

14. The non-transitory computer-readable medium of claim 13, wherein processing the arbitrary-order correlation information based on the error information to determine the target correlation information for identifying the environmental noise comprises:
determining, based on the error information, a correction factor corresponding to the arbitrary-order correlation information; and
determining a ratio of the arbitrary-order correlation information to the correction factor as the target correlation information.

15. The non-transitory computer-readable medium of claim 14, wherein determining, based on the error information, the correction factor corresponding to the arbitrary-order correlation information comprises:
acquiring a product of the error information and a preset coefficient; and
determining a difference between 1 and the product as the correction factor corresponding to the arbitrary-order correlation information.

16. The non-transitory computer-readable medium of claim 1, wherein the arbitrary-order correlation information comprises second-order correlation information.

17. The non-transitory computer-readable medium of claim 16, wherein determining the arbitrary-order correlation information for identifying the environmental noise based on the effective environmental information and the initial environmental information comprises:
determining an inner product of the effective environmental information and the initial environmental information as the second-order correlation information.

18. The non-transitory computer-readable medium of claim 17, wherein the set of instructions executable by at least one processor of the apparatus to cause the apparatus to further perform:
identifying a noise spectral density of the superconducting qubit using the second-order correlation information.

19. A non-transitory computer-readable medium storing a set of instructions executable by at least one processor of an apparatus to cause the apparatus to perform a method, the method comprising: acquiring first environmental information corresponding to a superconducting qubit at a first preset time, the superconducting qubit being received from a superconducting circuit; acquiring second environmental information corresponding to the superconducting qubit at a second preset time, the second preset time being different from the first preset time; and determining arbitrary-order correlation information for identifying an environmental noise based on the first environmental information and the second environmental information, wherein the first environmental information comprises at least one of information about a first magnetic flux in the environment, information about a first electric field in the environment, or fluctuation information about a first quantum noise in the environment; and the second environmental information comprises at least one of information about a second magnetic flux in the environment, information about a second electric field in the environment, or fluctuation information about a second quantum noise in the environment.

* * * * *